US012661779B2

(12) United States Patent
Motonaga

(10) Patent No.: US 12,661,779 B2
(45) Date of Patent: Jun. 23, 2026

(54) ROBOT SYSTEM, METHOD FOR CONTROLLING ROBOT SYSTEM, METHOD FOR MANUFACTURING PRODUCT USING ROBOT SYSTEM, CONTROL PROGRAM, AND RECORDING MEDIUM

(71) Applicant: CANON KABUSHIKI KAISHA, Tokyo (JP)

(72) Inventor: Yusaku Motonaga, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 228 days.

(21) Appl. No.: 18/337,310

(22) Filed: Jun. 19, 2023

(65) Prior Publication Data

US 2023/0415335 A1     Dec. 28, 2023

(30) Foreign Application Priority Data

Jun. 24, 2022     (JP) ................................. 2022-101953

(51) Int. Cl.
B25J 9/16          (2006.01)
B25J 13/00         (2006.01)
(Continued)

(52) U.S. Cl.
CPC ............. B25J 9/161 (2013.01); B25J 13/006 (2013.01); B25J 13/06 (2013.01); B25J 13/086 (2013.01)

(58) Field of Classification Search
CPC . B25J 9/161; B25J 13/006; B25J 13/06; B25J 13/086; B25J 9/1674; B25J 9/00;
(Continued)

(56) References Cited

U.S. PATENT DOCUMENTS 9,205,560 B1 * 12/2015  Edsinger ................ B25J 9/1674
2014/0214201 A1 *  7/2014  Takemoto ................ B25J 9/161
                                                                                    700/245
(Continued)

FOREIGN PATENT DOCUMENTS

JP          2014144495 A      8/2014
JP          2020121362 A      8/2020
(Continued)

*Primary Examiner* — Adam R Mott
*Assistant Examiner* — Alan Lindsay Ostrow
(74) *Attorney, Agent, or Firm* — Canon U.S.A., Inc. IP Division

(57)          ABSTRACT

A robot system includes a robot body, at least two first control devices provided in the robot body, a second control device that communicates with the first control devices, and first and second communication media each enabling the first control devices to communicate with the second control device. The second control device selectively operates in one of a first mode and a second mode. In the first mode, the second control device transmits information to a subset of the first control devices not using the second communication medium and using the first communication medium, and the second control device transmits information to the other first control devices not using the first communication medium and using the second communication medium, and in the second mode, the second control device transmits information to all the first control devices using both the first communication medium and second communication medium.

16 Claims, 19 Drawing Sheets

(51) Int. Cl.
  *B25J 13/06* (2006.01)
  *B25J 13/08* (2006.01)
(58) Field of Classification Search
  CPC .................... B25J 13/00; B25J 13/085; G05B
  2219/40202
  See application file for complete search history.

(56) References Cited

U.S. PATENT DOCUMENTS

| | | | |
|---|---|---|---|
| 2015/0081093 A1* | 3/2015 | Ogoh .......................... | B25J 9/16 |
| | | | 700/245 |
| 2019/0030721 A1* | 1/2019 | Hoshiyama ............ | B25J 9/1697 |
| 2019/0201137 A1* | 7/2019 | Shelton, IV ........... | G16H 50/20 |
| 2019/0299420 A1* | 10/2019 | Nakayama ............... | B25J 13/06 |
| 2021/0310679 A1* | 10/2021 | Toyama ................... | F24F 11/63 |
| 2022/0152815 A1* | 5/2022 | Hanamoto ............... | B25J 9/126 |

FOREIGN PATENT DOCUMENTS

| | | |
|---|---|---|
| JP | 2020142362 A | 9/2020 |
| WO | 2020213161 A1 | 10/2020 |

* cited by examiner

FIG. 8A
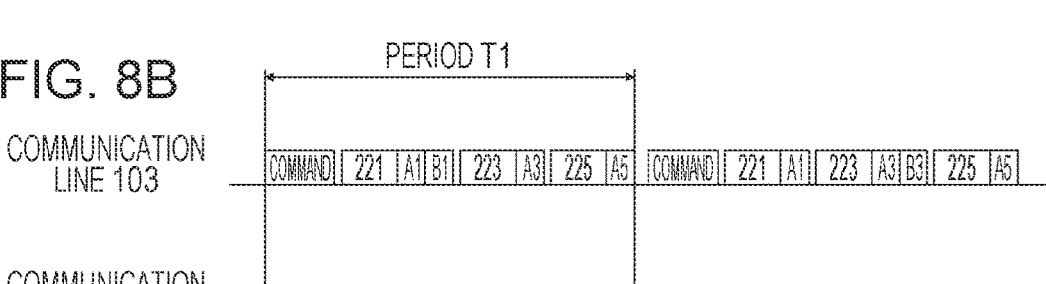
FIG. 8B
FIG. 8C
FIG. 8D
FIG. 8E
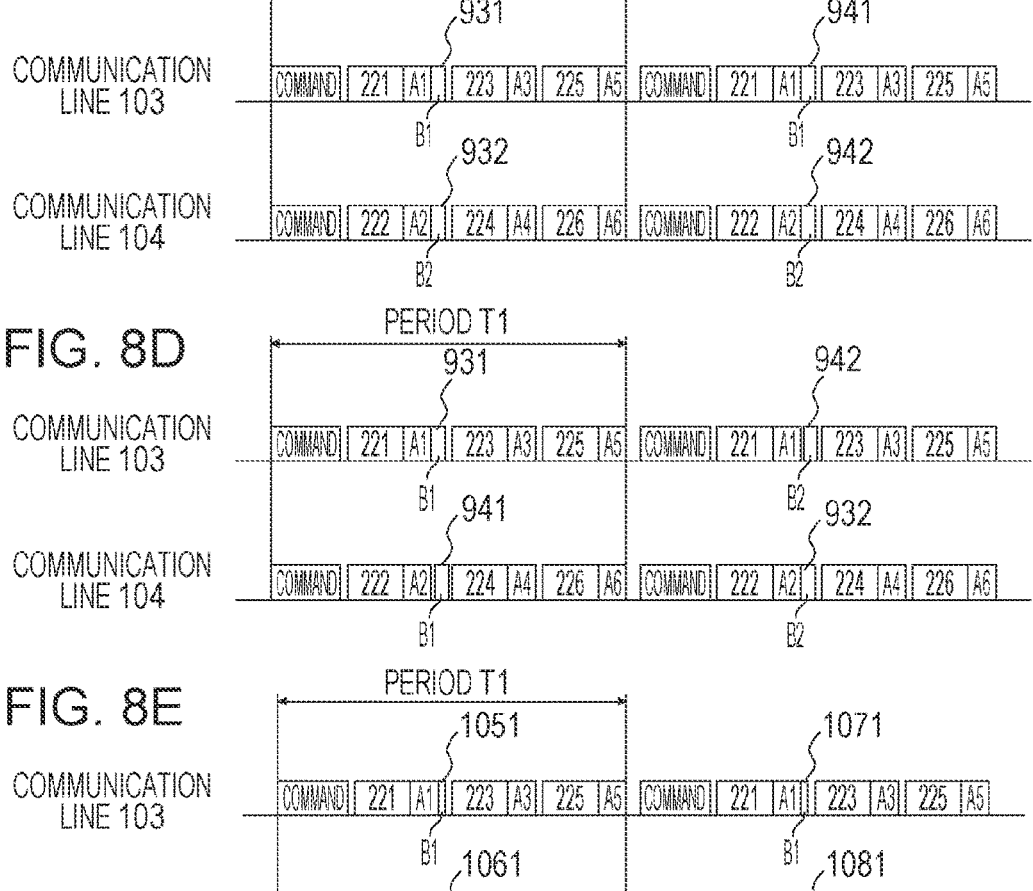

FIG. 10

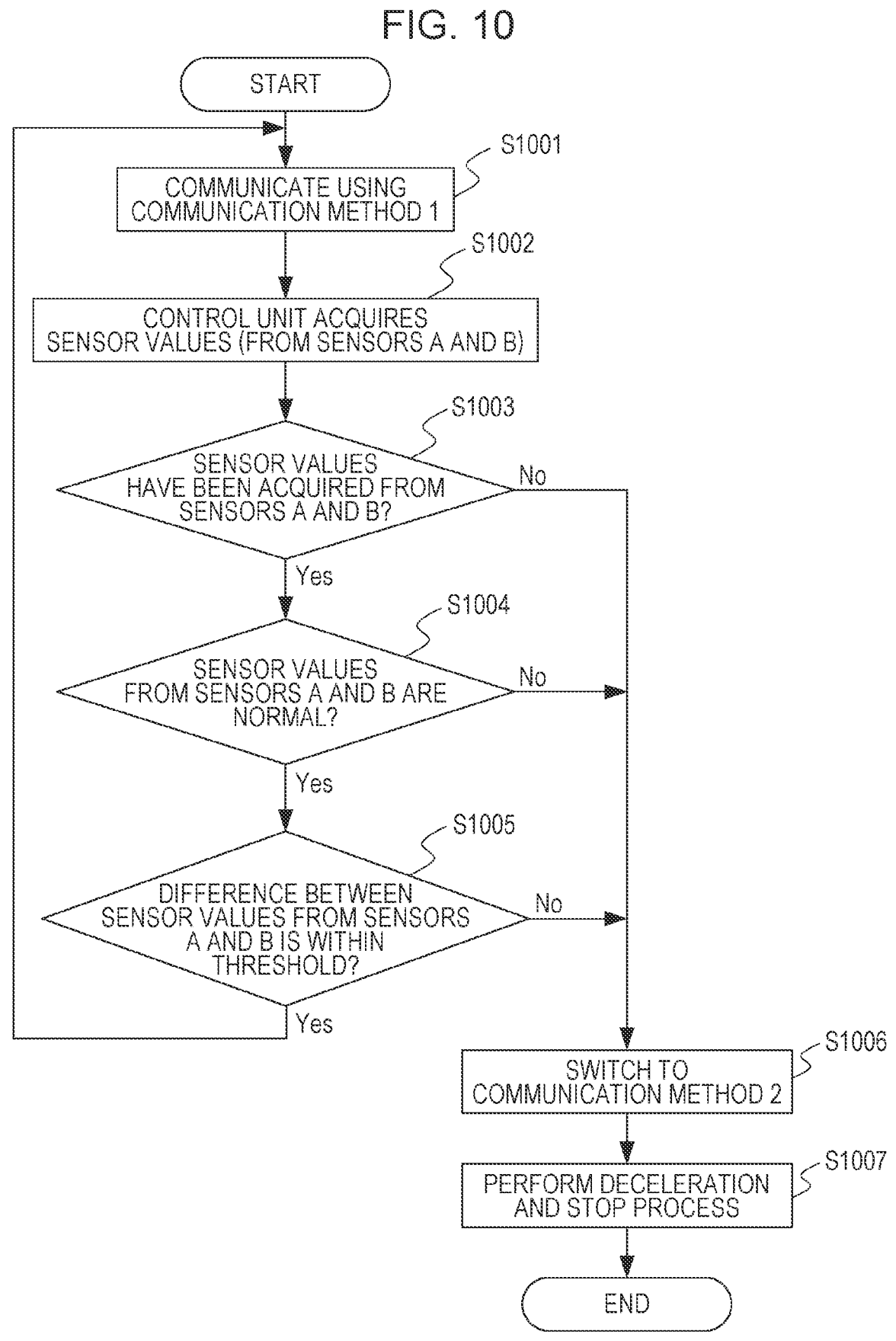

```
                    START

│
                      ▼
        ┌──────────────────────────────┐ ─── S1001
        │     COMMUNICATE USING         │
        │   COMMUNICATION METHOD 1      │
        └──────────────────────────────┘
                      │
                      ▼                  ─── S1002
        ┌──────────────────────────────┐
        │    CONTROL UNIT ACQUIRES      │
        │ SENSOR VALUES (FROM SENSORS A AND B) │
        └──────────────────────────────┘
                      │
                      ▼                  ─── S1003
               SENSOR VALUES
             HAVE BEEN ACQUIRED FROM  ───No──┐
               SENSORS A AND B?             │
                      │                     │
                     Yes                    │
                      ▼         S1004       │
               SENSOR VALUES               │
             FROM SENSORS A AND B ARE ──No──┤
                  NORMAL?                   │
                      │                     │
                     Yes                    │
                      ▼         S1005       │
             DIFFERENCE BETWEEN            │
           SENSOR VALUES FROM SENSORS ─No──┤
              A AND B IS WITHIN            │
                 THRESHOLD?                 │
                      │                     │
                     Yes                    ▼
                      │        ┌──────────────────────────────┐ ─ S1006
                      │        │       SWITCH TO               │
                      │        │  COMMUNICATION METHOD 2       │
                      │        └──────────────────────────────┘
                      │                     │
                      │                     ▼
                      │        ┌──────────────────────────────┐ ─ S1007
                      │        │  PERFORM DECELERATION         │
                      │        │    AND STOP PROCESS           │
                      │        └──────────────────────────────┘
                      │                     │
                      │                     ▼
                      │                    END
```

ROBOT SYSTEM, METHOD FOR CONTROLLING ROBOT SYSTEM, METHOD FOR MANUFACTURING PRODUCT USING ROBOT SYSTEM, CONTROL PROGRAM, AND RECORDING MEDIUM

BACKGROUND

Field of the Disclosure

The present disclosure relates to a robot system.

Description of the Related Art

In recent years, industrial robots used in factories and other industrial applications have been developed as cooperative robots that can work in cooperation with humans. These cooperative robots include sensors that can detect disturbances for the safety of workers. In addition, a redundant design is required in a sensor value acquisition system in order to reduce the danger to the operator caused by a control device that fails to recognize or falsely recognizes the sensor value of a disturbance-detectable sensor for some reason. For example, in International Publication No. WO2020/213161, each of sensors mounted in a robot body is connected to a control device by two communication lines to reduce the probability of the control device falsely recognizing or failing to recognize the sensor value.

SUMMARY

According to embodiments of the present disclosure, a robot system includes a robot body, at least two first control devices provided in the robot body, a second control device configured to communicate with the first control devices, a first communication medium configured to enable the first control devices to communicate with the second control device, and a second communication medium configured to enable the first control devices to communicate with the second control device, wherein the second control device selectively operates in one of a first mode and a second mode, wherein in the first mode, the second control device transmits information to a subset of the first control devices not using the second communication medium and using the first communication medium, and the second control device transmits information to the other first control devices not using the first communication medium and using the second communication medium, and wherein in the second mode, the second control device transmits information to all the first control devices using both the first communication medium and second communication medium.

Further features of the present disclosure will become apparent from the following description of exemplary embodiments with reference to the attached drawings.

BRIEF DESCRIPTION OF THE DRAWINGS

FIG. 2 is a control block diagram of the robot system according to the embodiment.

FIG. 6 is a control block diagram of the robot system according to the embodiment.

FIGS. 8A to 8E are timing diagrams of communication method 1 (the first mode) according to the embodiment.

FIG. 10 is a flowchart of the control process according to the embodiment.

FIG. 13 is a control block diagram of the robot system according to the embodiment.

FIGS. 14A and 14B are timing diagrams of communication method 1 (the first mode) and communication method 2 (the second mode), respectively, according to the embodiment.

FIG. 16 is a control block diagram of the robot system according to the embodiment.

DESCRIPTION OF THE EMBODIMENTS

In the technology described in International Publication No. WO2020/213161, two sensor values are obtained from each of the sensors at all times using two communication lines, which leads to an increase in the volume of communication, and an issue has arisen concerning improvement of the control period for controlling the robot body.

Accordingly, embodiments of the present disclosure provide improvement of the control period for controlling the robot body.

Exemplary embodiments of the present disclosure are described below with reference to the accompanying drawings. It should be noted that the embodiments described below are only illustrative, and for example, the details of the configuration can be changed by those skilled in the art without departing from the scope of the disclosure. In addition, the numerical values discussed in the present embodiment are for reference only and are not intended to limit the present disclosure. In the following drawings, the arrows X, Y, and Z in the figures indicate the coordinate system of the entire robot system. In general, the XYZ 3D coordinate system represents the world coordinate system of the entire installation environment. In addition, for the convenience of control, local coordinate systems may be used as appropriate for robot hands, fingers, joints, and the like.

First Embodiment

Figure 1:
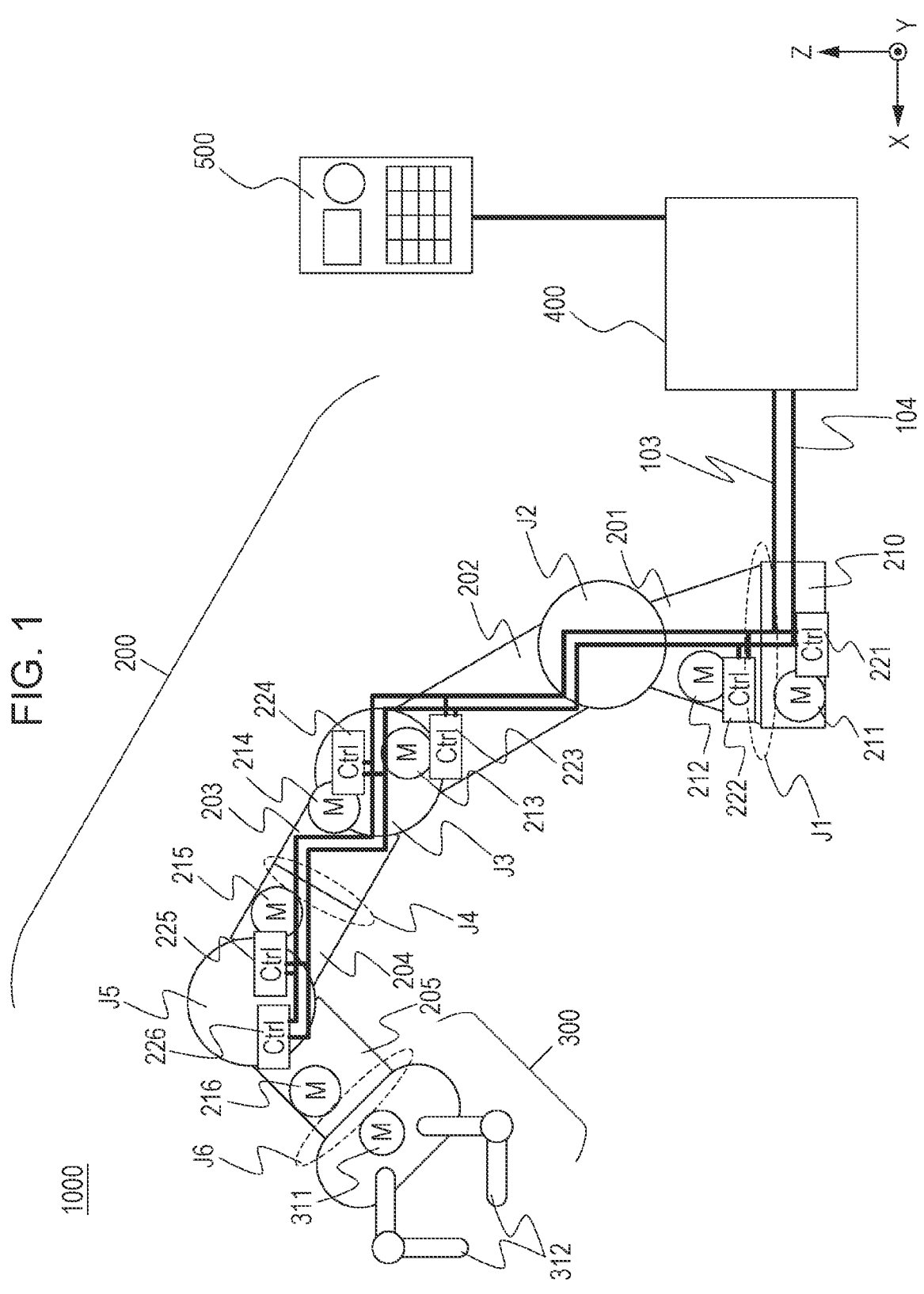
FIG. 1 is a schematic illustration of a robot system according to an embodiment.

FIG. 1 is a plan view of a robot system 1000 according to the present embodiment, viewed from any direction in the XYZ coordinate system. As illustrated in FIG. 1, the robot system 1000 includes an articulated robot arm body 200 and a robot hand body 300 as the robot body.

The robot system 1000 further includes a control device 400 that controls all the operations performed by a robot apparatus. Still furthermore, the robot system 1000 includes an external input device 500 as a teaching device that transmits teaching data to the control device 400. An example of the external input device 500 is a teaching pendant, which is used by the operator to specify the positions of the robot arm body 200 and robot hand body 300.

The present embodiment is described with reference to a robot hand provided at the front end of the robot arm body 200 as an end effector. However, the end effector is not limited thereto. For example, the end effector may be a tool or the like.

A link 201 that is the base end of the robot arm body 200 is provided on a base 210.

The robot arm body 200 includes the base 210, a plurality of joints J1 to J6 (for example, six joints (six axes)), and a plurality of links 201 to 205. The joints J1 to J6 include a plurality (six) of arm motors 211 to 216, respectively, as drive sources to rotatingly drive the joints about the axes of rotation. The arm motors 211 to 216 each include a motor encoder (not illustrated) that detects the rotational position of the motor output shaft.

The robot arm body 200 further includes arm motor control devices 221 to 226 for controlling the arm motors 211 to 216, respectively, and force sensors 251 to 256 (FIG. 2) each detecting torque as information regarding the force applied to one of the joints. Although, for simplicity of description, the arm motor control devices 221 to 226 are illustrated outside the robot arm body 200 in FIG. 1, each of the arm motor control devices 221 to 226 is provided near a corresponding one of the arm motors 211 to 216 inside the base 210 and the links 201 to 205. According to the present embodiment, description is made with reference to the case of six arm motor control devices as an example. However, embodiments of the present disclosure can be implemented if the robot includes at least two arm motor control devices.

In the robot arm body 200, the plurality of links 201 to 205 and the robot hand body 300 are connected by the joints J1 to J6 in a rotatable manner. The links 201 to 205 are connected in series in this order from the base end to the front end of the robot arm body 200.

As illustrated in FIG. 1, the base 210 of the robot arm body 200 and the link 201 are connected by the joint J1, which rotates in the direction of the Z-axis. The rotation of the arm motor 211 is transmitted to the link 201 by a transmission mechanism (not illustrated) so that the link 201 can rotate about the Z-axis in FIG. 1.

The link 201 and the link 202 of the robot arm body 200 are connected by the joint J2, which rotates about the Y-axis in FIG. 1. The rotation of the arm motor 212 is transmitted to the link 202 by a transmission mechanism (not illustrated) so that the link 202 can rotate about the Y-axis in FIG. 1.

The link 202 and the link 203 of the robot arm body 200 are connected by the joint J3, which rotates about the Y-axis in FIG. 1. The rotation of the arm motor 213 is transmitted to the link 203 by a transmission mechanism (not illustrated) so that the link 203 can rotate about the Y-axis in FIG. 1.

The link 203 and the link 204 of the robot arm body 200 are connected by the joint J4, which rotates about a predetermined axis located in the XZ plane in the direction in FIG. 1. The rotation of the arm motor 214 is transmitted to the link 204 by a transmission mechanism (not illustrated) so that the link 204 can rotate about the predetermined axis located in the XZ plane in the direction in FIG. 1.

The link 204 and the link 205 of the robot arm body 200 are connected by the joint J5, which rotates about the Y-axis in FIG. 1. The rotation of the arm motor 215 is transmitted to the link 205 by a transmission mechanism (not illustrated) so that the link 205 can rotate about the Y-axis in FIG. 1.

The link 205 of the robot arm body 200 and the robot hand body 300 are connected by the joint J6, which rotates about a predetermined axis located in the XZ plane in the direction in FIG. 1. The rotation of the arm motor 216 is transmitted to the robot hand body 300 by a transmission mechanism (not illustrated) so that the robot hand body 300 can rotate about a predetermined axis located in the XZ plane in the direction in FIG. 1.

The robot hand body 300 grasps a target object, such as an assembly or a tool. The robot hand body 300 of the present embodiment uses a drive mechanism (not illustrated) and a hand motor 311 to open and close the two finger portions 312 to grasp or release a workpiece and grasps the workpiece such that the workpiece is not displaced relative to the robot arm body 200.

The robot hand body 300 further includes a hand motor controller (not illustrated) to control the driving of the hand motor 311. The robot hand body 300 is connected to the link 205 via the joint J6, and when joint J6 rotates, the robot hand body 300 can also rotate.

Each of the arm motor control devices 221 to 226 is connected to the control device 400 by two communication lines 103 and 104, which are designed for redundancy, and can communicate with the control device 400.

The communication lines 103 and 104 are used to connect the control device 400 to each of the arm motor control devices 221 to 226 so as to transmit a command from the control device 400 and the reply from each of the arm motor control devices 221 to 226. The communication lines 103 and 104 are also referred to as a "first communication medium" and a "second communication medium", respectively.

The control device 400 transmits a control target value for each of the arm motors 211 to 216 to a corresponding one of the arm motor control devices 221 to 226 on the basis of the motion trajectory or the like input from the external input device 500 in advance. Thus, the control device 400 performs overall control of the arm motor control devices 221 to 226. In addition, each of the arm motor control devices 221 to 226 transmits, to the control device 400, a variety of information regarding a corresponding one of the arm motors 211 to 216, such as the current angle of the arm motor. The transmission from the control device 400 to each of the arm motor control devices 221 to 226 and from each of the arm motor control devices 221 to 226 to the control device 400 is performed at predetermined communication periods. The connection method between the control device 400 and each of the arm motor control devices 221 to 226 can be a cascade connection, a bus connection, or a daisy chain connection. According to the present embodiment, a bus connection is employed. As used herein, each of the arm motor control devices 221 to 226 is also referred to as a "first control device", and the control device 400 is also referred to as a "second control device".

The communication lines 103 and 104 connect the arm motor control devices 221 to 226 so that the arm motor control devices 221 to 226 share a variety of information. The connection method among the arm motor control devices 221 to 226 can be a cascade connection, a bus connection, or a daisy chain connection. According to the present embodiment, a bus connection is employed. In addition, the communication line 104 shares the variety of information among the arm motor control devices 221 to 226 at a period shorter than the communication period of the communication line 103. The communication period of the communication line 103 is set to about 2 ms, and the period of the communication line 104 is set to about 100 s. Although not illustrated in FIG. 1 for simplicity, the communication lines 103 and 104 are also connected to the hand motor controller and, thus, the hand motor controller can communicate with the control device 400 and each of the arm motor control devices 221 to 226.

According to the present embodiment, the hand of the robot arm body 200 refers to the robot hand body 300. When the robot hand body 300 is grasping an object, the robot hand body 300 and the grasped object (e.g., an assembly or a tool) are collectively referred to as the hand of the robot arm body 200. That is, regardless of whether the robot hand body 300 is grasping an object or not, the robot hand body 300, which is an end effector, is referred to as a hand.

The above-described configuration enables the robot arm body 200 to operate the robot hand body 300 at any position to perform a desired work. For example, by using a predetermined workpiece and another workpiece as materials and assembling the predetermined workpiece and the other workpiece, an assembled workpiece can be manufactured as a work product. As described above, the robot arm body 200 can be used to manufacture a product.

The robot hand body 300 may be an end effector such as a pneumatically driven air hand, for example. The robot hand body 300 can be attached to the link 205 in a semi-fixed manner (for example, using a screw) or can be attached in a removable manner (for example, using a latch fastener). In particular, when the robot hand body 300 is removable, a method can be employed for controlling the robot arm body 200 to operate to remove or exchange its own robot hand body 300 with one of a plurality of type of robot hand bodies 300 disposed at a supply location.

Figure 2:
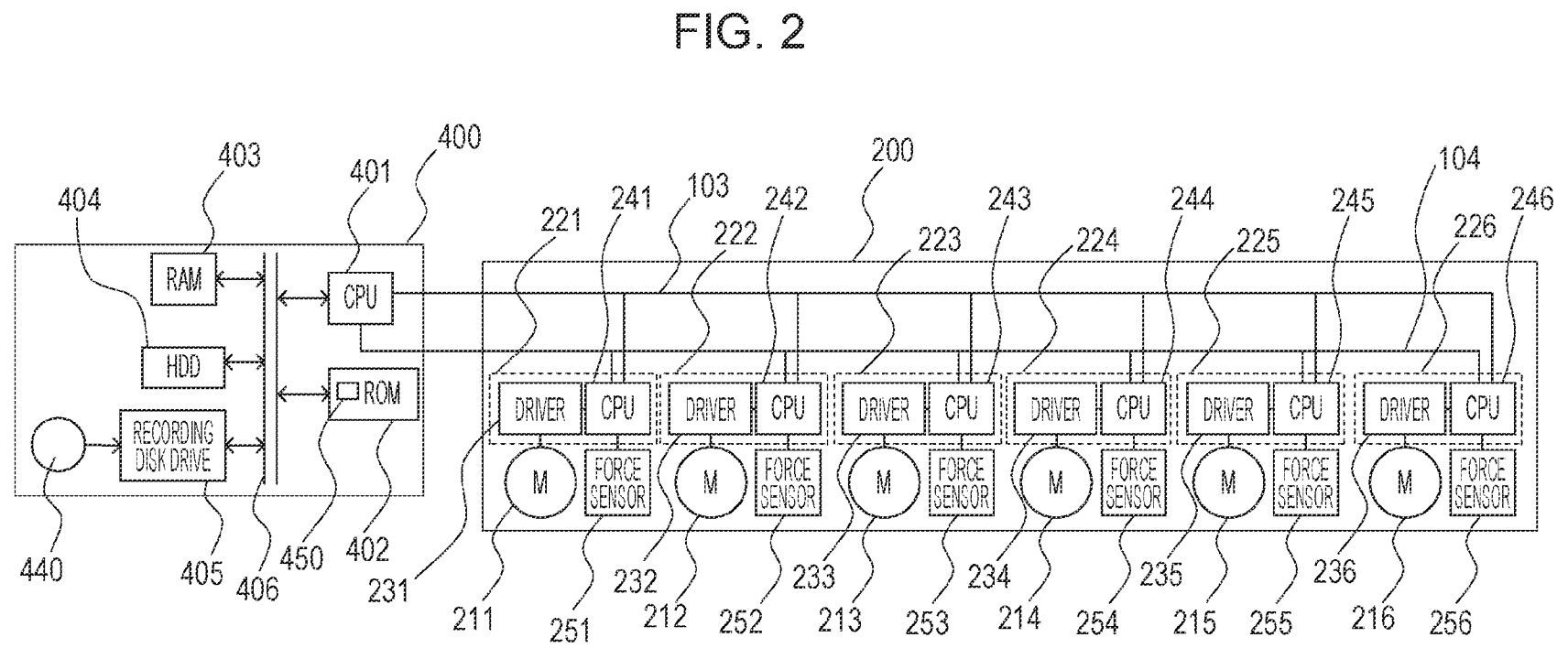

FIG. 2 is a control block diagram of the robot arm body 200. The arm motor control devices 221 to 226 provided in the joints of the main body of the robot arm body 200 include motor drivers 231 to 236, respectively. In addition, the arm motor control devices 221 to 226 include central processing units (CPUs) 241 to 246, respectively, and each of the joints includes a corresponding one of force sensors 251 to 256.

The control device 400 includes a CPU 401 and a read only memory (ROM) 402, a random access memory (RAM) 403, a hard disk drive (HDD) 404, and a recording disk drive 405 serving as storage units.

The control device 400 further include an input/output interface (not illustrated) to communicate with the external input device 500. The CPU 401, ROM 402, RAM 403, HDD 404, and recording disk drive 405 are connected to one another by a bus 406 so as to communication with one another. Furthermore, the communication line 103 is connected to the CPU 401 so that the CPU 401 can communicate with the CPUs 241 to 246 of the joints.

The ROM 402 is a non-transitory storage unit. The ROM 402 stores basic programs 450, such as BIOS, which are read by the CPU 401 at start-up to cause the CPU 401 to perform various arithmetic operations. The CPU 401 performs the various arithmetic operations on the basis of the basic programs recorded (stored) in the ROM 402. Alternatively, the basic programs 450 may be stored in the HDD 404.

The RAM 403 is a transitory storage unit used for the arithmetic operations performed by CPU 401. The HDD 404 is a non-transitory storage unit that stores a variety of data, such as the results of arithmetic operations performed by the CPU 401. The recording disk drive 405 can read variety of data, programs, and the like recorded on a recording disk 440.

According to the present embodiment, the basic programs 450 are recorded in the ROM 402. However, the present embodiment is not limited thereto. The basic programs 450 may be recorded on any recording medium as long as the recording medium is a non-transitory computer readable recording medium. Examples of a recording medium for supplying the basic programs 450 to a computer include a flexible disk, an optical disk, a magneto-optical disk, a magnetic tape, and a nonvolatile memory.

The CPUs 241 to 246 control the arm motors 211 to 216, respectively, in accordance with commands transmitted from the CPU 401 of the control device 400. The force sensors 251 to 256 periodically detect the forces applied to joints J1 to J6 and output the detection results to the CPUs 241 to 246, respectively. According to the present embodiment, torque sensors are used that detect the torques applied to the joints as forces. However, the force sensors 251 to 256 are not limited thereto. Any sensor that acquires information regarding disturbances of the robot arm body 200 can be used. The motor drivers 231 to 236 are driver circuits that generate electric currents to control the arm motors 211 to 216 on the basis of input signals transmitted from the CPUs 241 to 246, respectively.

The CPU 401 receives, for example, teaching point data input by the external input device 500 from an interface (not illustrated). The CPU 401 can generate the trajectory of the robot arm body 200 for each of the axes on the basis of the teaching point data input from the external input device 500 and transmit the trajectory to the CPUs 241 to 245 via the communication line 103. The CPU 401 outputs drive command data indicating the control amounts for the rotation angles of the arm motors 211 to 216 to the CPUs 241 to 246, respectively, at predetermined time intervals.

The CPUs 241 to 246 calculate the electric current output amounts supplied to the arm motors 211 to 216 on the basis of the drive commands received from the CPU 401 and output the electric current output amounts to the motor drivers 231 to 236, respectively. The motor drivers 231 to 236 then supply electric currents to the arm motors 211 to 216 to control the joint angles of the joints J1 to J6, respectively. The CPUs 241 to 246 perform feedback control on the arm motors 211 to 216 so that the present joint angle values of the joints J1 to J6, which are obtained on the basis of the rotation angles of the motor output shafts detected by motor encoders (not illustrated), are set to the target joint angles, respectively.

The force sensors 251 to 256 output information regarding the detected forces to the CPUs 241 to 246, respectively. That is, the CPUs 241 to 246 can acquire changes in the torque applied to the joints J1 to J6 detected by the force sensors 251 to 256, respectively. In addition, the CPUs 241 to 246 can stop the force control and the robot arm body 200 on the basis of the force information received from the force sensors 251 to 256.

Figures 3A, 3B:
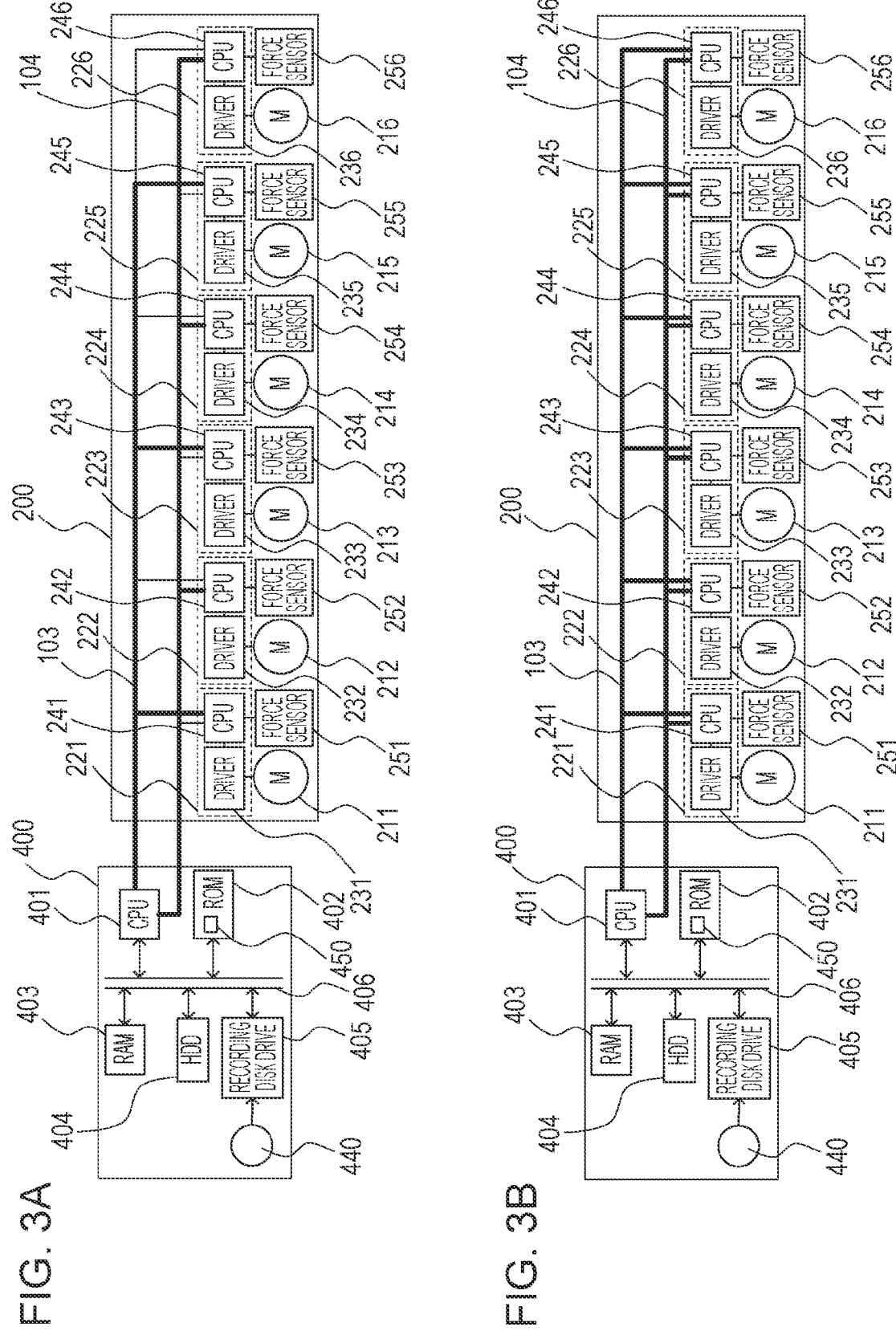
FIGS. 3A and 3B are control block diagrams for communication method 1 (a first mode) and communication method 2 (a second mode), respectively, according to the embodiment.

FIGS. 3A and 3B illustrate the communication method used when the robot arm body 200 is operating normally and when some abnormality has occurred. FIG. 3A illustrates the communication method used in the case where the robot arm body 200 is operating normally, and FIG. 3B illustrates the communication method used in the case where some abnormality has occurred in the robot arm body 200. As used herein, the term "abnormality" refers to a communication error that occurs in one of the communication lines (for example, wire breakage). According to the present embodiment, the communication method illustrated in FIG. 3A is also referred to as "communication method 1 (a first mode)", and the communication method illustrated in FIG. 3B is also referred to as "communication method 2 (a second mode)".

Referring to FIG. 3A, the control device 400 communicates with the arm motor control devices 221 to 226 periodically. In the case illustrated in FIG. 3A, the control device 400 communicates with some of the arm motor control devices via the communication line 103 and communicates with the other arm motor control devices via the communication line 104. In the example illustrated in FIG. 3A, the control device 400 communicates with the arm motor control devices 221, 223, and 225 via the communication line 103. In addition, the control device 400 communicates with the arm motor control devices 222, 224, and 226 via the communication line 104. During one communication period, each of the communication line 103 and communication line 104 relays communication between three of the arm motor control devices and the control device 400.

According to the present embodiment, half of the arm motor control devices 221 to 226 perform communication using the communication line 103, and the other half perform communication using the communication line 104. However, the present embodiment is not limited thereto. For example, four of the arm motor control devices 221 to 226 may perform communication using the communication line 103 (or the communication line 104), and the other two may perform communication using the communication line 104 (or the communication line 103).

Referring to FIG. 3B, like FIG. 3A, the control device 400 periodically communicates with the arm motor control devices 221 to 226. In the case illustrated in FIG. 3B, the control device 400 performs communication of the same information (the same communication) with the target arm motor control devices in parallel via the communication lines 103 and 104. In the example illustrated in FIG. 3B, the control device 400 communicates with the arm motor control devices 221 to 226 via each of the communication lines 103 and 104. The information communicated via the communication line 103 is the same as the information communicated via the communication line 104. As a result, even if communication via one of the communication lines is disconnected due to a malfunction or other reason, the communication can be continued via the other communication line. In the case illustrated in FIG. 3A, the volume of communication with the control device 400 can be reduced as compared with in the case illustrated in FIG. 3B.

The present embodiment is characterized in that the method for communicating information between the control device 400 and the arm motor control devices 221 to 226 is switched (performed) between normal mode and abnormal mode. In normal mode, the robot arm body 200 performs a predetermined work and, in abnormal mode, a malfunction that requires interruption of the work occurs.

Figures 4A, 4B:
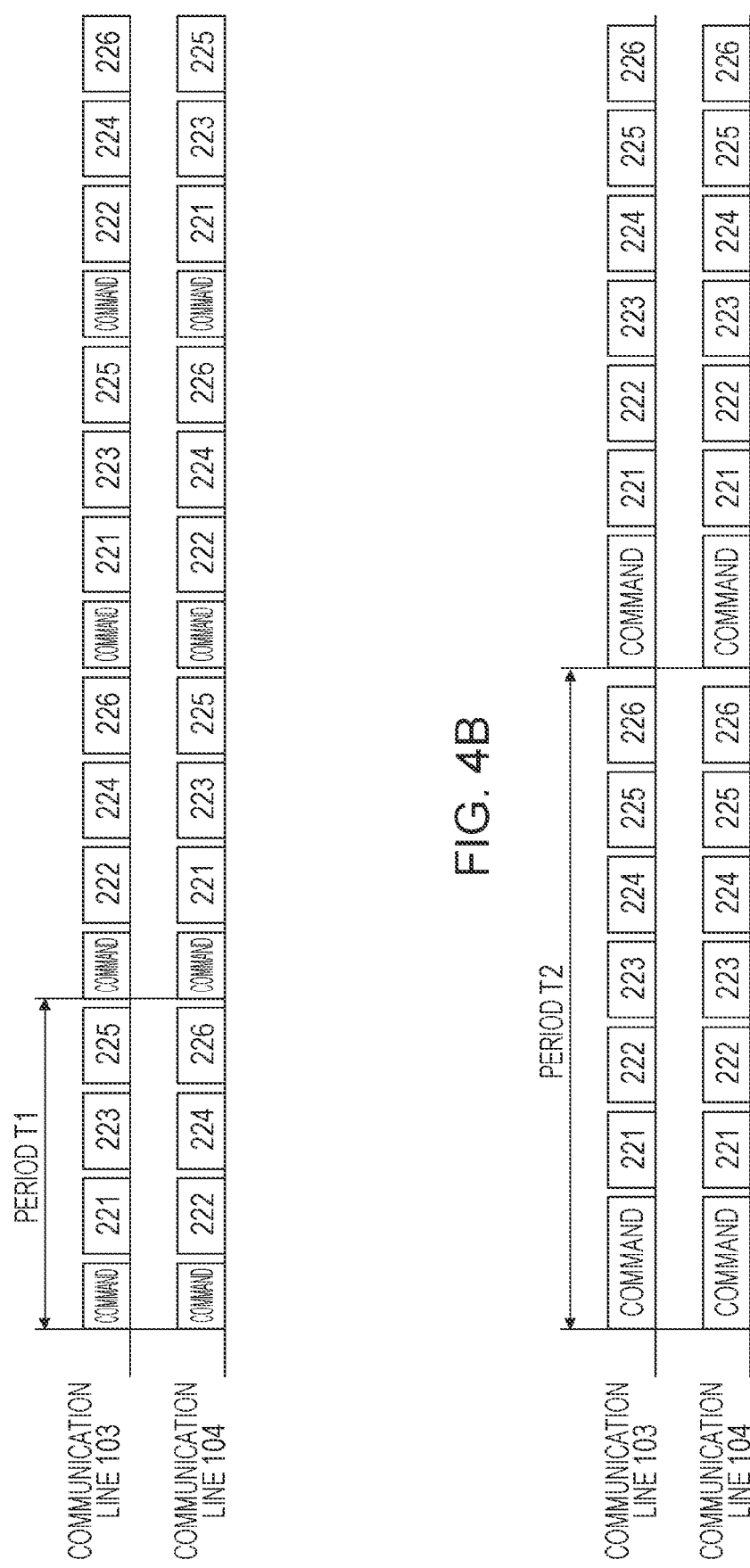
FIGS. 4A and 4B are timing diagrams of communication method 1 (the first mode) and communication method 2 (the second mode), respectively, according to the embodiment.

Communication method 1 and communication method 2 are described in detail below with reference to the timing diagrams illustrated in FIGS. 4A and 4B. FIG. 4A is a timing diagram for communication method 1, and FIG. 4B is a timing diagram for communication method 2.

Referring to FIG. 4A, according to communication method 1, commands are simultaneously transmitted from the control device 400 to the arm motor control devices 221 to 226 via the communication line 103 and communication line 104. Then, signals are sequentially transmitted from the arm motor control devices 221 to 226 to the control device 400 via the communication line 103 and communication line 104. At this time, the communication line 103 communicates with the arm motor control devices 221, 223, and 225. The communication line 104 communicates with the arm motor control devices 222, 224, and 226. According to communication method 1, communication using the communication line 103 and communication line 104 is performed at periods T1.

Referring to FIG. 4B, according to communication method 2, commands are simultaneously transmitted from the control device 400 to the arm motor control devices 221 to 226 via the communication line 103 and communication line 104. Then, signals are sequentially transmitted from the arm motor control devices 221 to 226 to the control device 400 via the communication line 103 and the communication line 104. At this time, communication with the arm motor control devices 221 to 226 is performed via both the communication line 103 and the communication line 104. According to communication method 2, communication using the communication line 103 and the communication line 104 is performed at periods T2.

Figure 5:
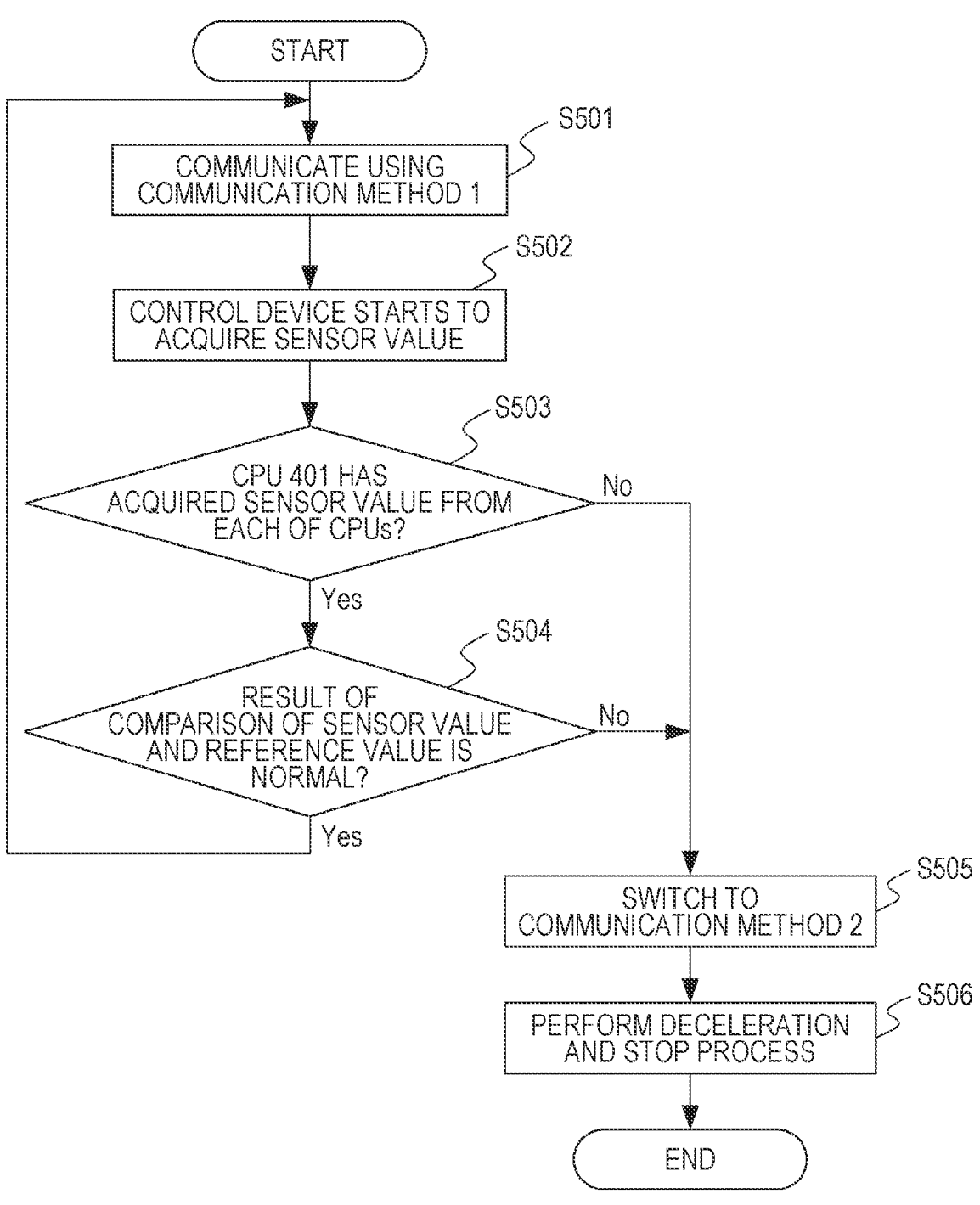
FIG. 5 is a flowchart of the control process according to the embodiment.

FIG. 5 is a control flowchart illustrating the switching between the communication methods according to the present embodiment. The control flowchart described in FIG. 5 is executed by the CPU 401 of the control device 400.

Referring to FIG. 5, in step S501, since normal control is performed in the robot arm body 200, communication is performed with each of the arm motor control devices 221 to 226 using communication method 1 at periods T1. According to communication method 1, the arm motor control devices are divided into two groups each consisting of three arm motor control devices, and communication is performed with the two groups using the communication lines 103 and 104. Therefore, the communication period can be reduced in normal times.

In step S502, sensor values are started to be acquired from the sensors connected to the arm motor control devices 221 to 226.

In step S503, it is determined whether in step S502, the CPU 401 has correctly received the sensor values (or signals) from the CPUs 241 to 246. If the sensor values from all the CPUs 241 to 246 are correctly received by CPU 401 (Yes in step S503), the processing proceeds to step S504. If the sensor value (or the signal) has not been received from any of the CPUs 241 to 246 (No in step S503), the processing proceeds to step S505. This is because it can be determined that at least one CPU from which the sensor value has not been received is found and, thus, some abnormality has occurred in the communication system or the robot arm body 200.

In step S504, each of the sensor values acquired through step S502 and step S503 is compared with a reference sensor value set by a user in advance, and it is determined whether the detected sensor value or the difference between the sensor value and the reference value is within a threshold. If the sensor value or the difference is within the threshold (Yes in step S504), it is determined that the communication system is normal, and the processing returns to step S501. Otherwise (No in step S504), it is determined that some abnormality has occurred in the communication system or the robot arm body 200, and the processing proceeds to step S505.

In step S505, the communication method is switched to communication method 2 in which communication between the control device 400 and each of the arm motor control devices is performed at periods T2. Communication method 2 is a redundantly designed communication method for communicating with each of the arm motor control devices via the communication lines 103 and 104. As a result, even if some abnormality occurs in one of the communication lines, data can be acquired from each of the arm motor control devices.

In step S506, the control device 400 uses communication method 2 and performs a process on the arm motor control devices to decelerate and stop the arm motors.

As described above, according to the present embodiment, the communication method used for communication between the control device 400 and each of the arm motor control devices 221 to 226 to control the motors in the robot arm is switched in accordance with whether the robot or the communication system is in a normal mode or an abnormal mode. Thus, in a normal mode, communication can be performed with a reduced communication period. As a result, the control period can be improved. In an abnormal mode, redundancy, reliable communication can be performed and, thus, user safety can be improved.

Second Embodiment

The second embodiment is described in detail below. Hereinafter, parts of the hardware configuration and the control system configuration that differ from those of the first embodiment are illustrated and described. The same parts as those of the first embodiment can have the same configurations and operations as those described above, and detailed description is not given.

Figure 6:
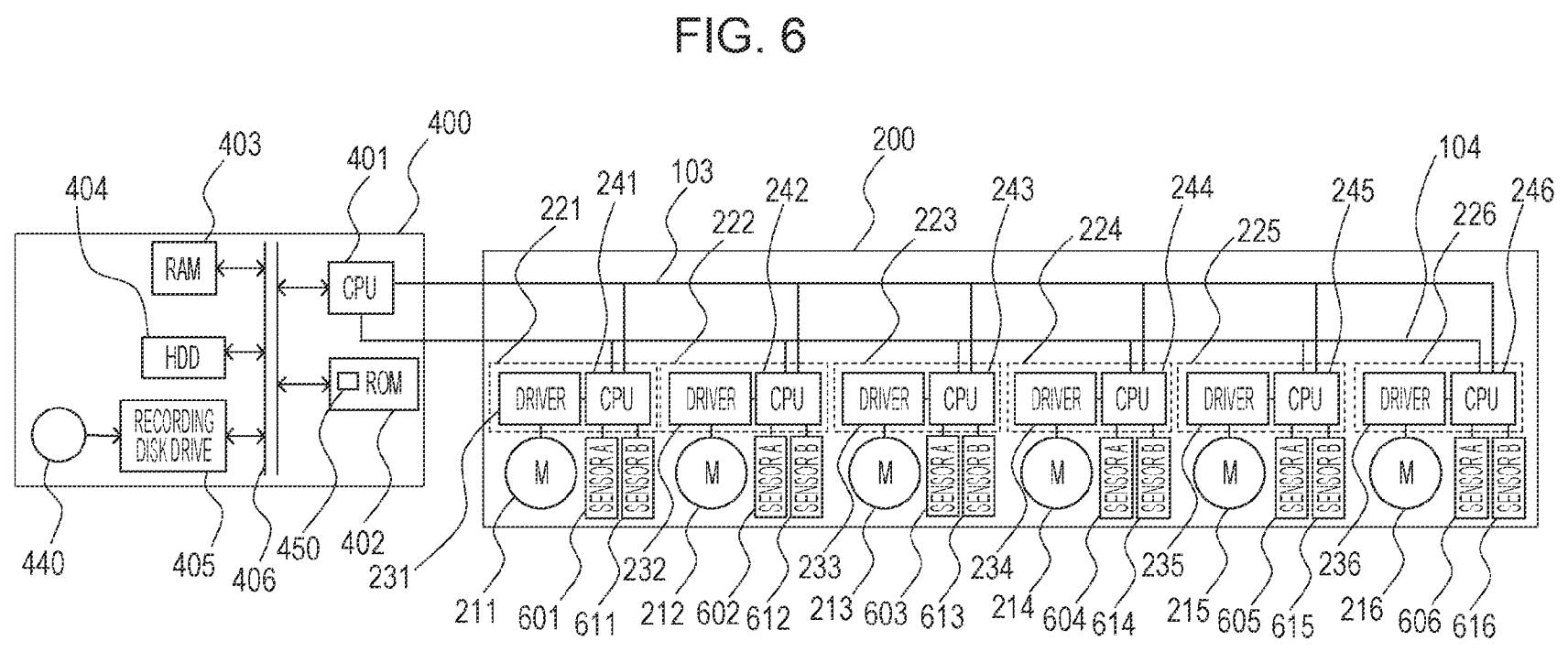

FIG. 6 is a control block diagram of a robot arm body 200 according to the present embodiment.

According to the present embodiment, two encoders, which are sensors, are mounted in each of motors of the robot arm body 200. The encoders are referred to as "sensor A601 to A606" and "sensor B611 to B616". The sensors A601 to A606 are used to control the motors of the robot arm body 200. The sensors B611 to B616 are used to determine whether the values acquired by the sensors A601 to A606 are normal, respectively. The sensor A is also referred to as a "first detection unit", and the sensor B is also referred to as a "second detection unit". In addition, the detection result of the sensor A is also be referred to as a "first detection result", and the detection result of the sensor B is also referred to as a "second detection result".

Figures 7A, 7B:
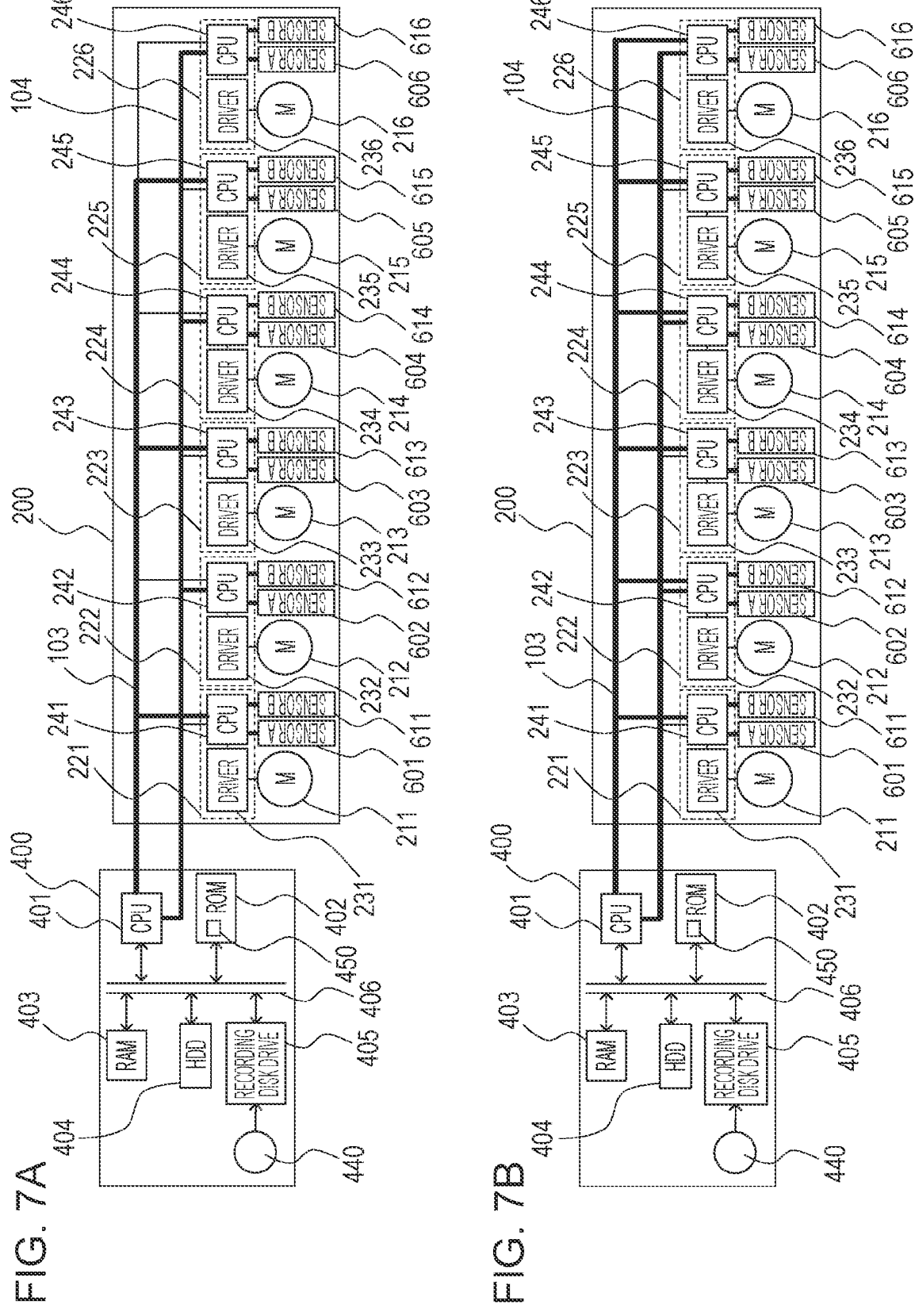
FIGS. 7A and 7B are control block diagrams of communication method 1 (the first mode) and communication method 2 (the second mode), respectively, according to the embodiment.

FIGS. 7A and 7B illustrate the communication methods used when the robot arm body 200 is operating normally and when some abnormality occurs. FIG. 7A illustrates the communication method used in the case where the robot arm body 200 is operating normally, and FIG. 7B illustrates the communication method used in the case where some abnormality has occurred in the robot arm body 200. As used herein, the term "abnormality" refers to a communication error that occurs in one of the communication lines (for example, wire breakage). According to the present embodiment, the communication method illustrated in FIG. 7A is also referred to as "communication method 1 (a first mode)", and the communication method illustrated in FIG. 7B is also referred to as "communication method 2 (a second mode)".

Referring to FIG. 7A, the control device 400 communicates with the arm motor control devices 221 to 226 periodically. In the case illustrated in FIG. 7A, the control device 400 communicates with some of the arm motor control devices via the communication line 103 and communicates with the other arm motor control devices via the communication line 104. In the example illustrated in FIG. 7A, the control device 400 communicates with the arm motor control devices 221, 223, and 225 via the communication line 103. In addition, the control device 400 communicates with the arm motor control devices 222, 224, and 226 via the communication line 104. During one communication period, each of the communication line 103 and communication line 104 relays communication between the three arm motor control devices and the control device 400.

According to the present embodiment, half of the arm motor control devices 221 to 226 perform communication using the communication line 103, and the other half perform communication using the communication line 104. However, the present embodiment is not limited thereto. For example, four of the arm motor control devices 221 to 226 may perform communication using the communication line 103 (or the communication line 104), and the other two may perform communication using the communication line 104 (or the communication line 103).

Referring to FIG. 7B, like FIG. 7A, the control device 400 periodically communicates with the arm motor control devices 221 to 226. In the case illustrated in FIG. 7B, the control device 400 performs communication of the same information (the same communication) with the target arm motor control devices in parallel via the communication lines 103 and 104. In the example illustrated in FIG. 7B, the control device 400 communicates with the arm motor control devices 221 to 226 via each of the communication lines 103 and 104. The information communicated via the communication line 103 is the same as the information communicated via the communication line 104. As a result, even if communication via one of the communication lines is disconnected due to a malfunction or other reason, communication can be continued via the other communication line. In the case illustrated in FIG. 7A, the volume of communication with the control device 400 can be reduced as compared with in the case illustrated in FIG. 7B.

In the case illustrated in FIG. 7B, some kind of abnormality has occurred in the robot arm body 200, and a malfunction may have occurred in any of the sensors other than the wire breakage. Therefore, the values acquired from the sensor A and sensor B are transmitted to the control device 400 via the communication lines 103 and 104 so that the control device 400 can reliably determine whether an abnormality has occurred in any of the sensors.

FIGS. 8A to 8E illustrate examples of a timing diagram of communication method 1 according to the present embodiment. FIG. 8A illustrates an example of transmission of the signal of a sensor B to the control device 400 in every period. FIG. 8B is an example of transmission of the signal of a sensor B to the control device 400 while being shifted to the following period. FIGS. 8C, 8D, and 8E are examples of transmission of the signals of the sensors B separated by a bit.

Referring to FIG. 8A, according to communication method 1, commands are simultaneously transmitted from the control device 400 to the arm motor control devices 221 to 226 via the communication line 103 and the communication line 104. Then, signals are sequentially transmitted from the arm motor control devices 221 to 226 to the control device 400 via the communication line 103 and communication line 104. At this time, the control device 400 communicates with the arm motor control devices 221, 223, and 225 via the communication line 103. In addition, the control device 400 communicates with the arm motor control devices 222, 224, and 226 via the communication line 104. The signals of the sensor A and sensor B corresponding to the arm motor control devices 221, 223, and 225 are transmitted to the control device 400 via the communication line 103.

The signals of the sensor A and sensor B corresponding to the arm motor control devices 222, 224, and 226 are transmitted to the control device 400 via the communication line 104. According to communication method 1, communication via the communication line 103 and communication line 104 is performed at periods T1.

In the case of communication method 1 illustrated in FIG. 7A, the robot arm body 200 is normal. Thus, according to communication method 1, the signals of the sensors B611 to B616 may not need to be returned every period. This case is discussed in detail below.

Referring to FIG. 8B, according to communication method 1, commands are simultaneously transmitted from the control device 400 to the arm motor control devices 221 to 226 via the communication line 103 and communication line 104. Then, signals are sequentially transmitted from the arm motor control devices 221 to 226 to the control device 400 via the communication line 103 and communication line 104. At this time, the control device 400 communicates with the arm motor control devices 221, 223, and 225 via the communication line 103. In addition, the control device 400 communicates with the arm motor control devices 222, 224, and 226 via the communication line 104.

In FIG. 8A, the signals of the sensors B are transmitted in period T1. However, in FIG. 8B, the signals of the sensors B611 and B612 are transmitted in period T1, the signals of the sensors B613 and B614 are transmitted in the following period T1, and so on. Thus, transmission of the signals of each of the sensors B is shifted to the following period. This enables period T1 in FIG. 8B to be shorter than period T1 in FIG. 8A.

Referring to FIG. 8C, according to communication method 1, commands are simultaneously transmitted from the control device 400 to the arm motor control devices 221 to 226 via the communication line 103 and communication line 104. Then, signals are sequentially transmitted from the arm motor control devices 221 to 226 to the control device 400 via the communication line 103 and communication line 104. At this time, the control device 400 communicates with the arm motor control devices 221, 223, and 225 via the communication line 103. In addition, the control device 400 communicates with the arm motor control devices 222, 224, and 226 via the communication line 104.

In FIG. 8A, the signals of sensors B611 to B616 are transmitted in period T1. However, in FIG. 8C, the signal of the sensor B611 is divided into high-order bits 931 and low-order bits 941. Similarly, the signal of the sensor B612 is divided into high-order bits 932 and low-order bits 942. Then, in period T1, the high-order bits 931 and high-order bits 932 are transmitted via the communication line 103 and communication line 104, respectively, and in the following period, the low-order bits 941 and the low-order bits 942 are transmitted via the communication lines 103 and 104, respectively. Thereafter, the signals of each of the sensors B613 and B614 are similarly divided into high-order bits and low-order bits, and the low-order bits are transmitted in the following period T1 via the communication line 103 and communication line 104. This enables period T1 in FIG. 8C to be shorter than periods T1 in each of FIG. 8A and FIG. 8B.

Referring to FIG. 8D, according to communication method 1, commands are simultaneously transmitted from the control device 400 to the arm motor control devices 221 to 226 via the communication line 103 and communication line 104. Then, signals are sequentially transmitted from the arm motor control devices 221 to 226 to the control device 400 via the communication line 103 and communication line 104. At this time, the control device 400 communicates with the arm motor control devices 221, 223, and 225 via the communication line 103. In addition, the control device 400 communicates with the arm motor control devices 222, 224, and 226 via the communication line 104.

In FIG. 8A, the signals of sensors B611 to B616 are transmitted in period T1. However, in FIG. 8D, the signal of the sensor B611 is divided into high-order bits 931 and low-order bits 941. The high-order bits 931 are then transmitted together with the signal of the arm motor control device 221 via the communication line 103 and, separately, only the low-order bits 941 are transmitted via the communication line 104 after the signals of the arm motor control device 222 and the sensor A602. In the following period, the signal of the sensor B612 is divided into high-order bits 932 and low-order bits 942. Thereafter, the high-order bits 932 are transmitted together with the signal of the arm motor control device 222 via the communication line 104 and, separately, only the low-order bits 942 are transmitted via the communication line 103 after the signals of the arm motor control device 221 and the sensor A601. This enables period T1 in FIG. 8D to be shorter than periods T1 in each of FIG. 8A and FIG. 8B.

Referring to FIG. 8E, according to communication method 1, commands are simultaneously transmitted from the control device 400 to the arm motor control devices 221 to 226 via the communication line 103 and the communication line 104. Then, signals are sequentially transmitted from the arm motor control devices 221 to 226 to the control device 400 via the communication line 103 and communication line 104. At this time, the control device 400 communicates with the arm motor control devices 221, 223, and 225 via the communication line 103. In addition, the control device 400 communicates with the arm motor control devices 222, 224, and 226 via the communication line 104.

In FIG. 8A, the signals of the sensors B611 to B616 are transmitted in period T1. However, in FIG. 8E, the signal of the sensor B611 is divided into a first bit group 1051, a second bit group 1061, a third bit group 1071, and a fourth bit group 1081. The first bit group 1051 is then transmitted together with the signal of the arm motor control device 221 via the communication line 103 and, separately, only the second bit group 1061 is transmitted via the communication line 104 after the signals of the arm motor control device 222 and the sensor A602. In the following period, the third bit group 1071 is transmitted together with the signal of the arm motor control device 221 via the communication line 103 and, separately, only the fourth bit group 1081 is transmitted via the communication line 104 after the signals of the arm motor control device 222 and the sensor A602. Thereafter, in the following period, the signal of the sensor B612 is divided into first to fourth bit groups, and the bit groups are sequentially transmitted in the same manner as described above. Since the signal is divided into bits, period T1 in FIG. 8E can be shorter than period T1 in each of FIGS. 8A and 8B. In addition, since the signal is divided into four bit groups, the period T1 in FIG. 8E can be shorter than the period T1 in each of FIGS. 8B and 8D.

Figure 9:
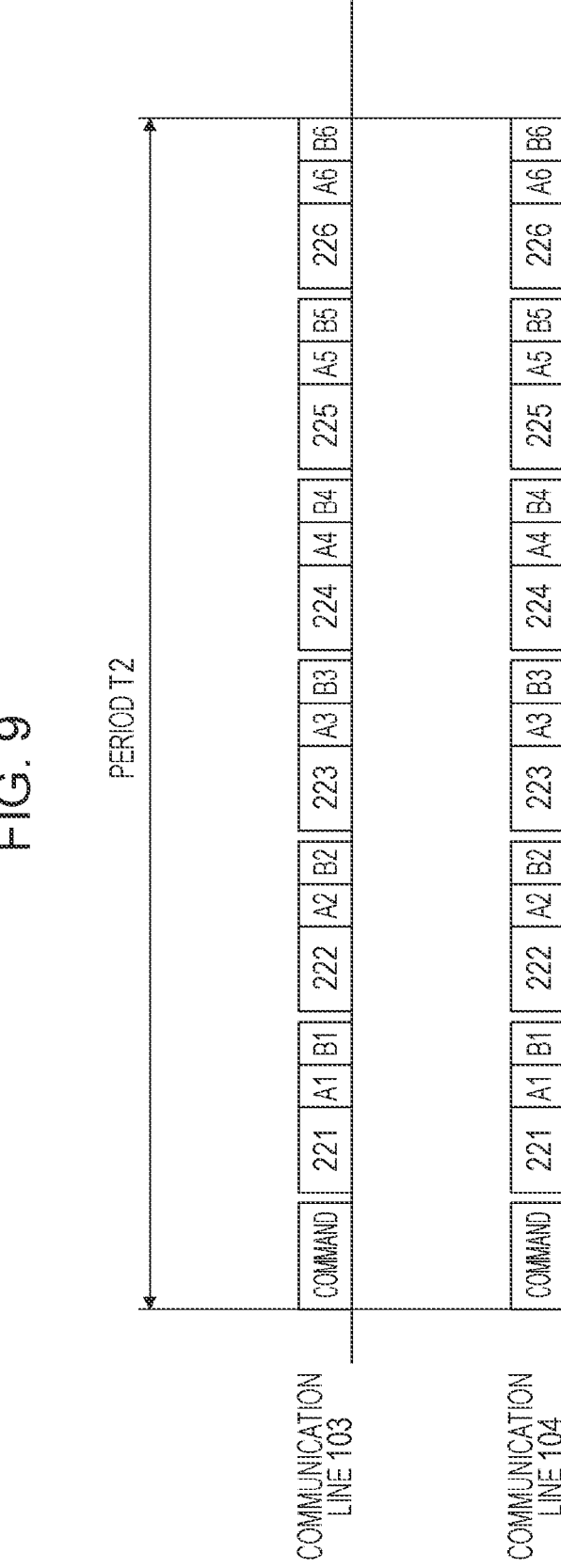
FIG. 9 is a timing diagram of communication method 2 (a second mode) according to the embodiment.

FIG. 9 is an example of a timing diagram of communication method 2 according to the present embodiment. Referring to FIG. 9, according to communication method 2, commands are simultaneously transmitted from the control device 400 to the arm motor control devices 221 to 226 via the communication line 103 and communication line 104. Then, signals are sequentially transmitted from the arm motor control devices 221 to 226 to the control device 400 via the communication lines 103 and communication line 104. At this time, the control device 400 communicates with the arm motor control devices 221 to 226 via both the communication lines 103 and 104. According to communication method 2, communication via the communication line 103 and communication line 104 are performed at periods T2. As a result, the values acquired by the sensors A and B are reliably transmitted to the control device 400 via the communication lines 103 and 104.

FIG. 10 is a control flowchart illustrating switching between the communication methods according to the present embodiment.

The control flowchart illustrated in FIG. 10 is executed by the CPU 401 of the control device 400.

Referring to FIG. 10, in step S1001, since normal control is being performed in the robot arm body 200, communication is performed with each of the arm motor control devices 221 to 226 using communication method 1 based on period T1. According to communication method 1, the arm motor control devices are divided into two groups each consisting of three arm motor control devices, and communication is performed with one group using the communication line 103 and the other group using the communication line 104. Therefore, the communication period can be reduced in normal times.

In step S1002, sensor values are acquired from the sensors A601 to A606 and the sensors B611 to B616 that are connected to the arm motor control devices 221 to 226, respectively. To acquire the sensor values, any of the methods illustrated in FIG. 8A, FIG. 8B, FIG. 8C, FIG. 8D, and FIG. 8E may be used.

In step S1003, it is determined whether the sensor values are acquired from the sensors A601 to A606 and the sensors B611 to B616. If the sensor values are acquired from all the sensors A and B, it is determined that the condition is normal (Yes in step S1003), and the processing proceeds to step S1004.

If, in step S1003, any of sensors A601 to A606 and B611 to B616 cannot acquire the sensor value, it is determined that an abnormality occurs (No in step S1003), and the processing proceeds to step S1006.

In step S1004, it is determined whether the sensor values acquired from sensors A601 to A606 and sensors B611 to B616 are all normal. To make the determination, a reference sensor value set by a user in advance is compared with each of the sensor values of the sensors 601 to 606 and the sensors B611 to B616 to determine whether the detected sensor value or the difference between the sensor value and the reference value is within a threshold. The reference values can be the same value for all sensors, or a reference value can be set for each of the sensors. If the sensor values or the differences are all within the threshold (Yes in step S1003), it is determined that the sensor values are normal, and the processing proceeds to step S1005. If any of the sensor values is not within the threshold (No in step S1004), it is determined that some abnormality has occurred in a communication system, a sensor system, or the robot arm body 200, and the processing proceeds to step S1006.

In step S1005, the value of each of the sensors A601 to A606 is compared with the value of a corresponding one of the sensors B611 to B616 acquired in step S1002, and it is determined whether the difference is within the threshold. If the difference is within the threshold for all the sensors (Yes in step S1005), it is determined that the sensor values are normal, and the processing returns to step S1001. If the difference is not within the threshold (No in step S1005), it is determined that some abnormality has occurred in the communication system, the sensor system, or the robot arm body 200, and the processing proceeds to step S1006.

In step S1006, the communication method between the control device 400 and each of the arm motor control devices 221 to 226 at periods T2 is switched to communication method 2. Communication method 2 is a redundantly designed communication method in which communication with each of the arm motor control devices 221 to 226 is performed via the communication lines 103 and 104. As a result, even if some abnormality occurs in one of the communication lines, data can be acquired from each of the arm motor control devices 221 to 226.

In step S1007, the control device 400 uses communication method 2 and performs a process on the arm motor control devices 221 to 226 to decelerate and stop the arm motors.

According to the present embodiment, the configuration has been described above in which the sensors A601 to A606 of the encoders for controlling the arm motors 211 to 216 are connected to the sensors B611 to B616 for determining that the operations of the sensors A are normal, respectively. In normal times, the communication period is reduced by two communication lines using communication method 1, and the volume of communication of the values of the sensors B611 to B616 is divided, so that the communication period can be reduced as compared with communication method 2 used in abnormal times. In addition, in abnormal times, redundant and reliable communication can be performed, which increases user safety.

Third Embodiment

The third embodiment is described in detail below. According to the present embodiment, a communication method switching process is described while the robot arm body 200 is operating or while a user (an operator) is teaching the robot arm body 200. Hereinafter, parts of the hardware configuration and the control system configuration that differ from those of the above-described embodiments are illustrated and described. The same parts as those of the first embodiment can have the same configurations and operations as those described above, and detailed description is not given.

According to the present embodiment, the configuration of the first embodiment illustrated in FIG. 2 is employed, and the force sensors 251 to 256 are connected to the arm motor control devices 221 to 226, respectively, to detect (acquire) the forces applied to the links. Thus, the forces can be periodically detected (acquired). In addition, the robot arm body 200 has two modes: a working mode and a teaching mode. In the working mode, the robot performs a work taught in advance by the user and usually repeats a predetermined operation until the robot is instructed to stop the operation.

In the teaching mode, the user teaches the robot the path, trajectory, and teaching points along which the robot arm body 200 operates in working mode. To teach the robot, an operator may operate the robot arm body 200 via the external input device 500. Alternatively, the user may teach the robot arm body 200 to perform an operation by directly applying an external force to the robot arm body 200 and manipulating (controlling) the robot arm body 200 to move in the direction of the applied external force, which is called direct teach.

When teaching, the user moves closer to or touches the robot arm body 200, which may endanger the user depending on the operation performed by the robot arm body 200. For this reason, reliable communication with the robot arm body 200 is required. Therefore, according to the present embodiment, in the teaching mode, communication is performed using communication method 2 described in the above embodiment. The communication methods 1 and 2 according to the present embodiment are the same as those according to the above-described embodiment.

Figure 11:
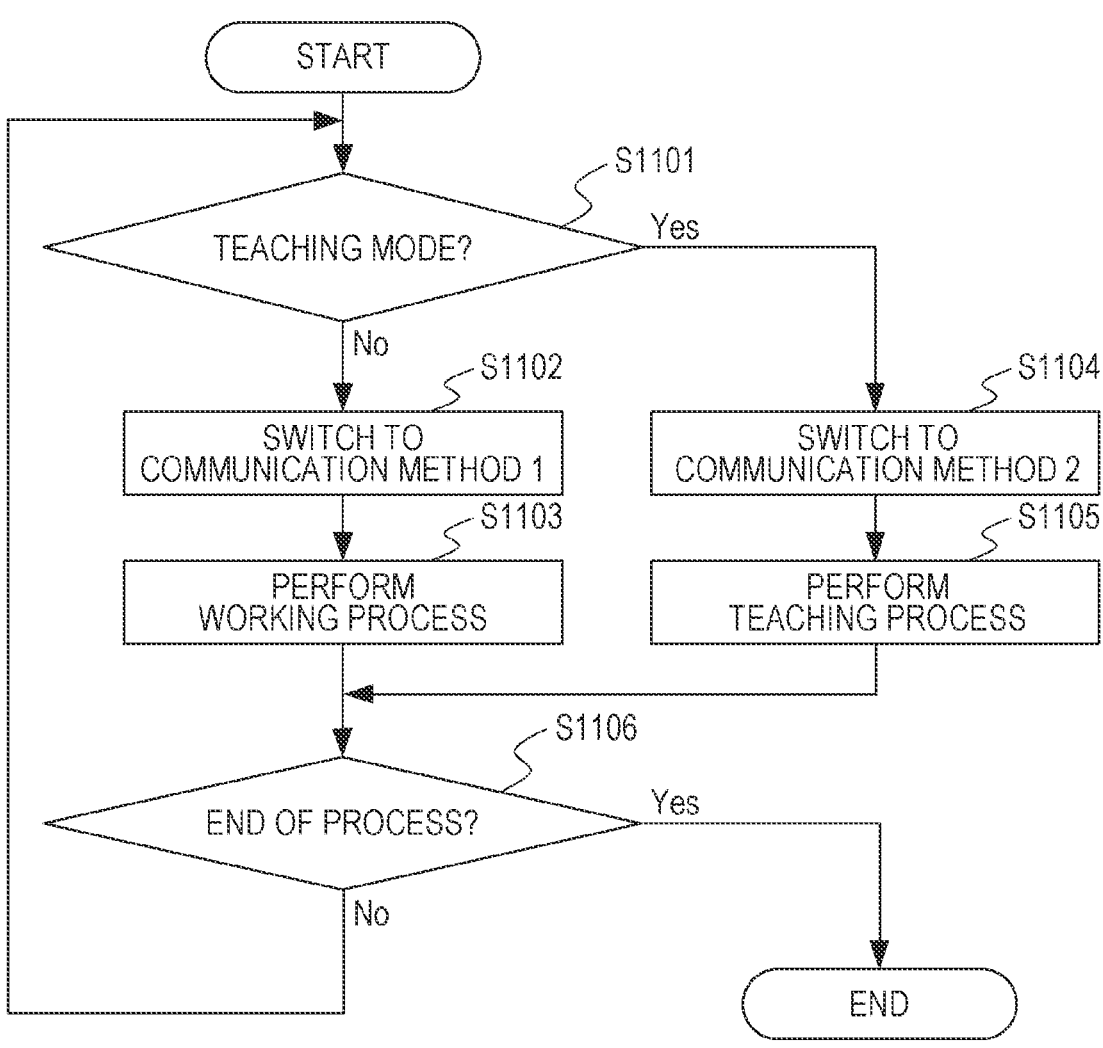
FIG. 11 is a flowchart of the control process according to the embodiment.

FIG. 11 is a control flowchart illustrating switching between the two communication methods according to the present embodiment.

The control flowchart illustrated in FIG. 11 is executed by the CPU 401 of the control device 400.

Referring to FIG. 11, in step S1101, it is determined whether the operation mode of the robot arm body 200 is the working mode or the teaching mode. If the operation mode is the working mode (No in step S1101), the processing proceeds to step S1102. If the operation mode is the teaching mode (Yes in step S1101), the processing proceeds to step S1104.

In step S1102, since the robot arm body 200 is in the working mode to perform a normal operation and, thus, the level of danger to the user is low, communication method 1 is selected, which enables the communication period to be reduced. In step S1103, the robot performs the working process to do the work taught in advance. In step S1106, it is determined whether the working process has been completed. If not (No in step S1106), the processing returns to step S1101 again, and the above-described processing is repeated. If the working process has been completed (Yes in step S1106), the process flow ends.

In step S1104, the operation mode is the teaching mode in which the user teaches the robot arm body 200 how to operate. Therefore, the user may be located near the robot arm body 200, which may endanger the user. For this reason, communication method 2 is selected, which can reliably control the robot arm body 200. In step S1105, a teaching process is performed to teach the robot arm body 200 how to perform the operation. In step S1106, it is determined whether the teaching process has been completed. If not (No in step S1106), the processing returns to step S1101 again, and the above-described processing is repeated. If the teaching process has been completed (Yes in step S1106), the process flow ends.

According to the present embodiment, in the teaching mode of the robot arm body 200, communication is performed using communication method 2, which takes user safety into consideration. When the robot arm body 200 does a work based on the teaching result, communication is performed using communication method 1. This enables both user safety and improved controllability (improved control period) during robot operation.

Fourth Embodiment

The fourth embodiment is described in detail below. The present embodiment describes the switching process between the communication methods when a user (an operator) moves closer to the robot arm body 200 while the robot arm body 200 is operating. Hereinafter, parts of the hardware configuration and the control system configuration that differ from those of the above-described embodiments are illustrated and described. The same parts as those of the first embodiment can have the same configurations and operations as those described above, and detailed description is not given.

According to the present embodiment, the configuration according to the first embodiment illustrated in FIG. 2 is employed, and force sensors 251 to 256 that detect (acquire)

the forces applied to the links are connected to the arm motor control devices 221 to 226, respectively, so as to be able to periodically detect (acquire) the forces. In addition, the robot arm body 200 has two modes: a working mode and a cooperating mode. In the working mode, the robot performs a work taught by the user in advance and usually repeats a predetermined operation until the robot is instructed to stop the operation.

The robot arm body 200 enters the cooperating mode when a user moves closer to the robot arm body 200 operating in the working mode. Then, the robot arm body 200 does a work that is to be done in the working mode at such a reduced speed (low speed) that the user is not exposed to danger even when a predetermined portion of the robot arm body 200 contacts the operator. When the user moves away from the robot arm body 200, the mode is switched to the working mode. The control device 400 determines whether the user moves closer to or away from the robot arm body 200 on the basis of the detection result from a detection sensor (not illustrated). As the detection sensor, a widely used sensor, such as a range sensor or an infrared sensor, is mounted in the robot arm body 200. The sensor location is an appropriate location where the operator's approach can be detected, such as the front end of the robot arm body 200 or the base of the robot arm body 200.

Since in the cooperating mode, the user is in close proximity to the robot arm body 200, some movement of the robot arm body 200 may endanger the user. For this reason, reliably communication with the robot arm body 200 is required. Therefore, according to the present embodiment, in the teaching mode, communication is performed using communication method 2 described in the above embodiments. The communication methods 1 and 2 according to the present embodiment are the same as those according to the above-described embodiments.

Figure 12:
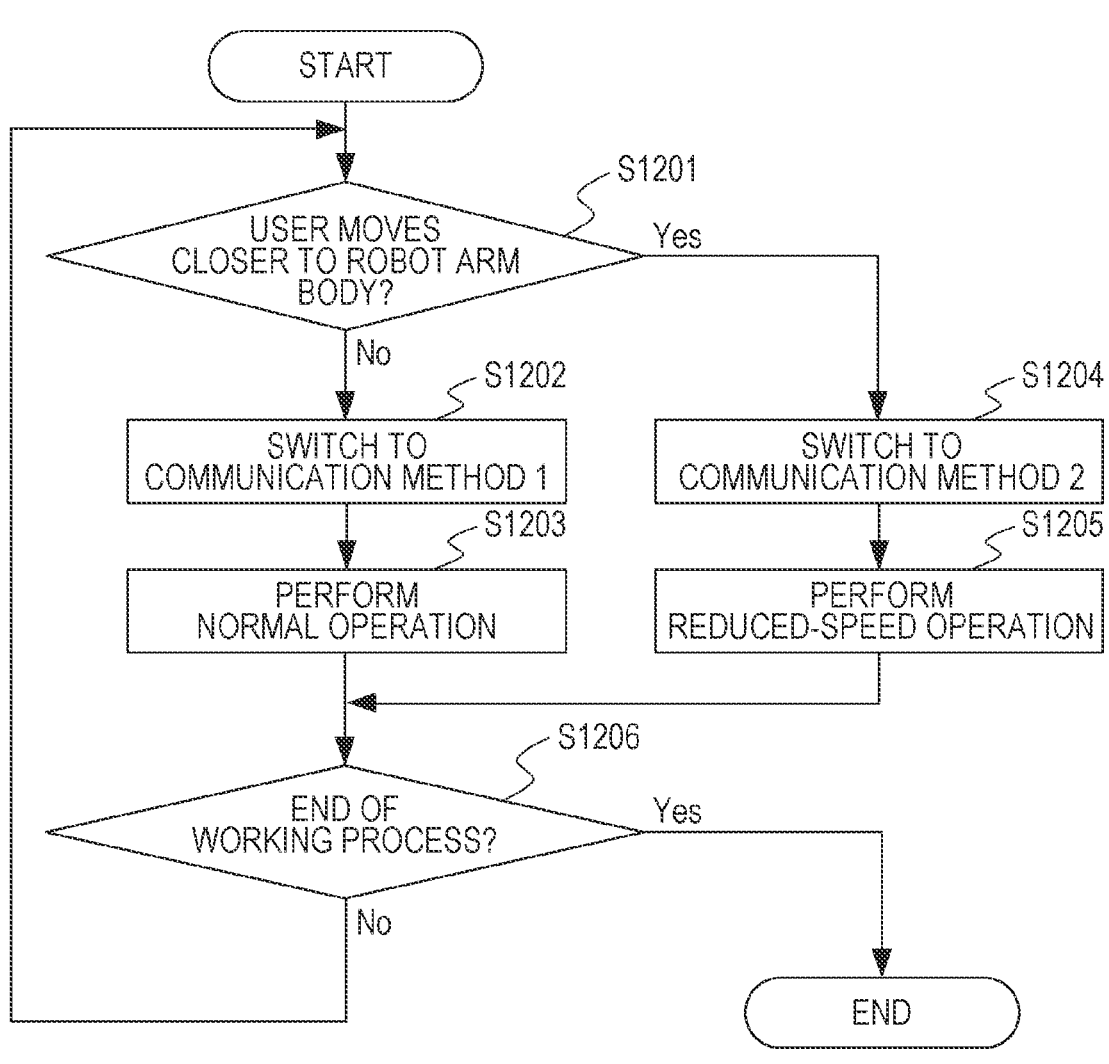
FIG. 12 is a flowchart of the control process according to the embodiment.

FIG. 12 is a control flowchart illustrating switching between the two communication methods according to the present embodiment.

The control flowchart illustrated in FIG. 12 is executed by the CPU 401 of the control device 400.

Referring to FIG. 12, in step S1201, it is determined whether a user or another person moves closer to the robot arm body 200 by using a detection sensor. If the user does not move closer to the robot arm body 200 (No in step S1201), the processing proceeds to step S1202. If the user moves closer to the robot arm body 200 (Yes in step S1201), the processing proceeds to S1204.

In step S1202, since the user is not close to the robot arm body 200 and, thus, the level of danger to the user is low, communication method 1 is selected, which enables the communication period to be reduced. In step S1203, the working process to do a work taught in advance is performed in normal operation mode. In step S1206, it is determined whether the working process has been completed. If not (No in step S1206), the processing returns to step S1201 again and repeats the above-described processing. If the working process has been completed (Yes in step S1206), the process flow ends.

In step S1204, the user moves closer to the robot arm body 200 and may be located in the close vicinity of the robot arm body 200, which may endanger the user. Therefore, communication method 2 is selected that can reliably control the robot arm body 200. Then, in step S1205, the robot arm body 200 performs working process at such a reduced speed (low speed) that the user is not exposed to danger even when a predetermined portion of the robot arm body 200 contacts the user. In step S1206, it is determined whether the working process has been completed. If not (No in step S1206), the processing returns to step S1201 again and repeats the above-described processing. If the working process has been completed (Yes in step S1206), the process flow ends.

As described above, according to the present embodiment, when the user moves closer to the robot arm body 200, communication is performed using communication method 2, which takes user safety into consideration, and when the user does not move closer to the robot arm body 200, communication is performed using communication method 1. This enables both user safety and controllability during robot operation.

Fifth Embodiment

The fifth embodiment is described in detail below. The present embodiment is described with reference to a case in which wireless communication is used for communication between the control device 400 and each of the arm motor control devices 221 to 226. Hereinafter, parts of the hardware configuration and the control system configuration that differ from those according to the above-described embodiments are illustrated and described. The same parts as those of the first embodiment can have the same configurations and operations as those described above, and detailed description is not given.

Figure 13:
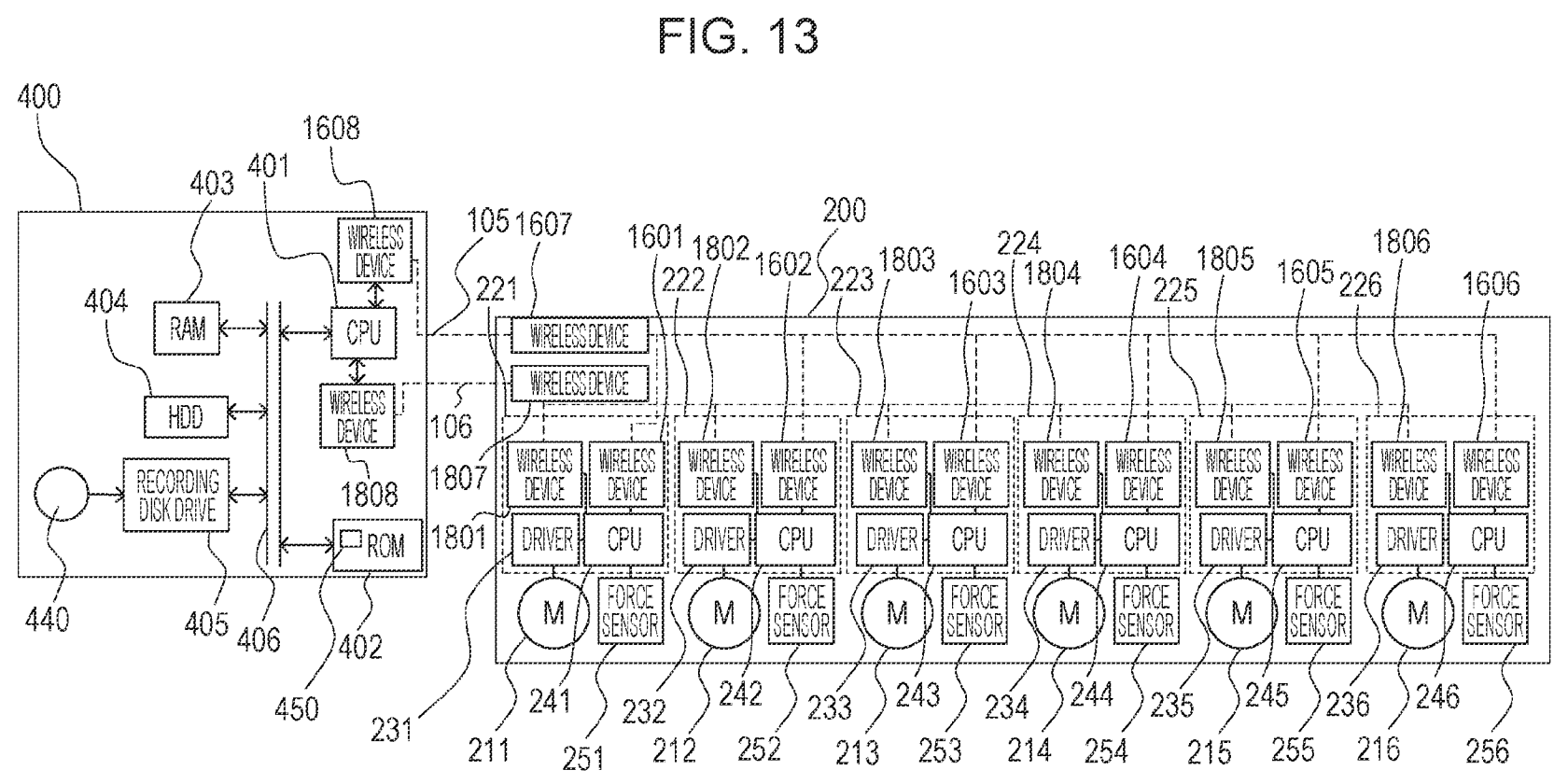

FIG. 13 is a control block diagram of the robot arm body 200 according to the present embodiment. Referring to FIG. 13, the arm motor control devices 221 to 226 include wireless devices 1601 to 1606 and wireless devices 1801 to 1806, which are connected to the CPUs 241 to 246, respectively. Furthermore, the robot arm body 200 includes a wireless device 1607 that performs overall control of the wireless devices 1601 to 1606 for wireless communication and a wireless device 1807 that performs overall control of the wireless devices 1801 to 1806 for wireless communication. The control device 400 includes a wireless device 1608 that performs wireless communication with the wireless device 1607. The wireless device 1608 is connected to the CPU 401. Similarly, the control device 400 further includes a wireless device 1808 that performs wireless communication with the wireless device 1807. The wireless device 1808 is connected to the CPU 401. Through wireless communication 105 using the wireless devices 1601 to 1608, the CPU 401 can communicate with the CPUs 241 to 246. In addition, through wireless communication 106 using the wireless devices 1801 to 1808, the CPU 401 can communicate with the CPUs 241 to 246.

While the present embodiment is described with reference to an example in which the robot arm body 200 includes the wireless devices 1607 and 1807 that perform overall control of the wireless devices, the configuration is not limited thereto. For example, the wireless devices 1607 and 1807 may be removed, and the wireless devices 1601 to 1606 may be directly connected to each other using, for example, daisy chain and be connected to the wireless device 1608. In addition, the wireless devices 1801 to 1806 may be directly connected using, for example, daisy chain and be connected to the wireless device 1808. Although not illustrated for simplicity, the wireless communications 105 and 106 are further connected to the hand motor controller and are capable of communicating with the control device 400 and the arm motor control devices 221 to 226. The wireless communication 105 is also referred to as a "first communication medium", and the wireless communication 106 is also referred to as a "second communication medium".

Figure 14A:
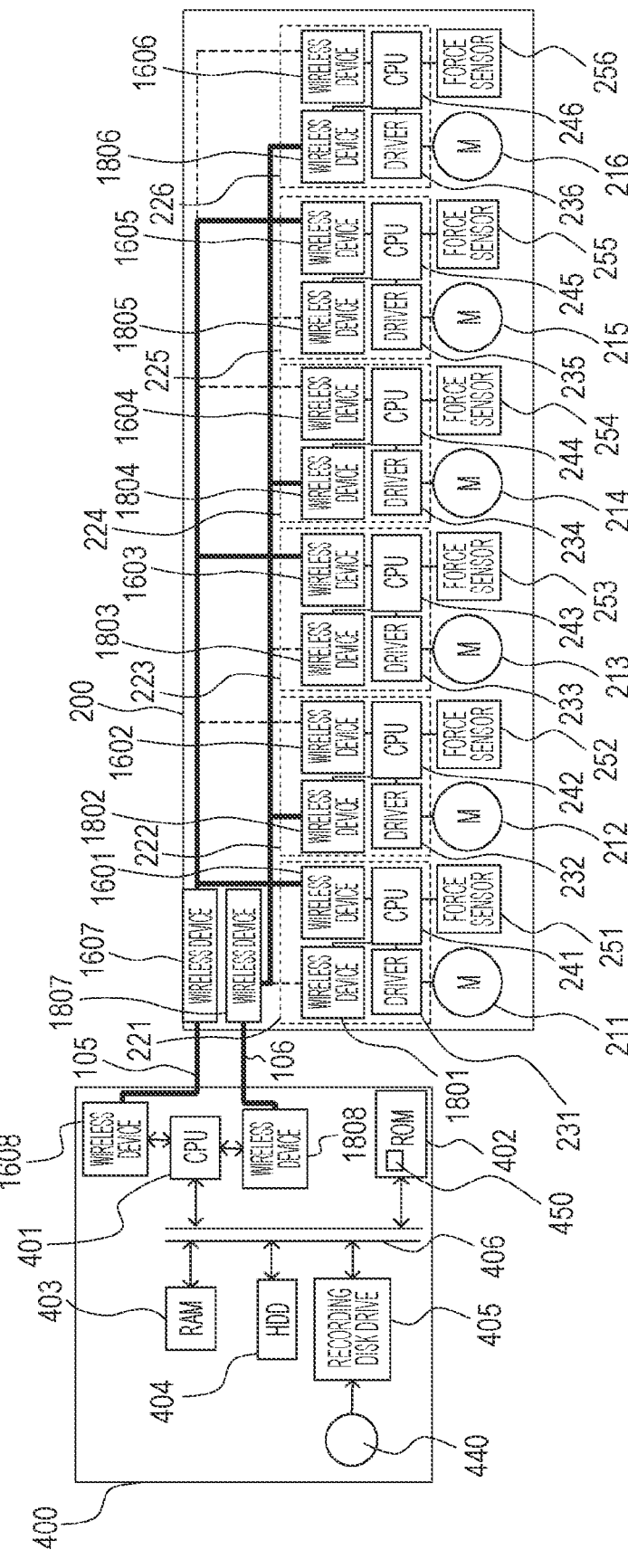
Figure 14B:
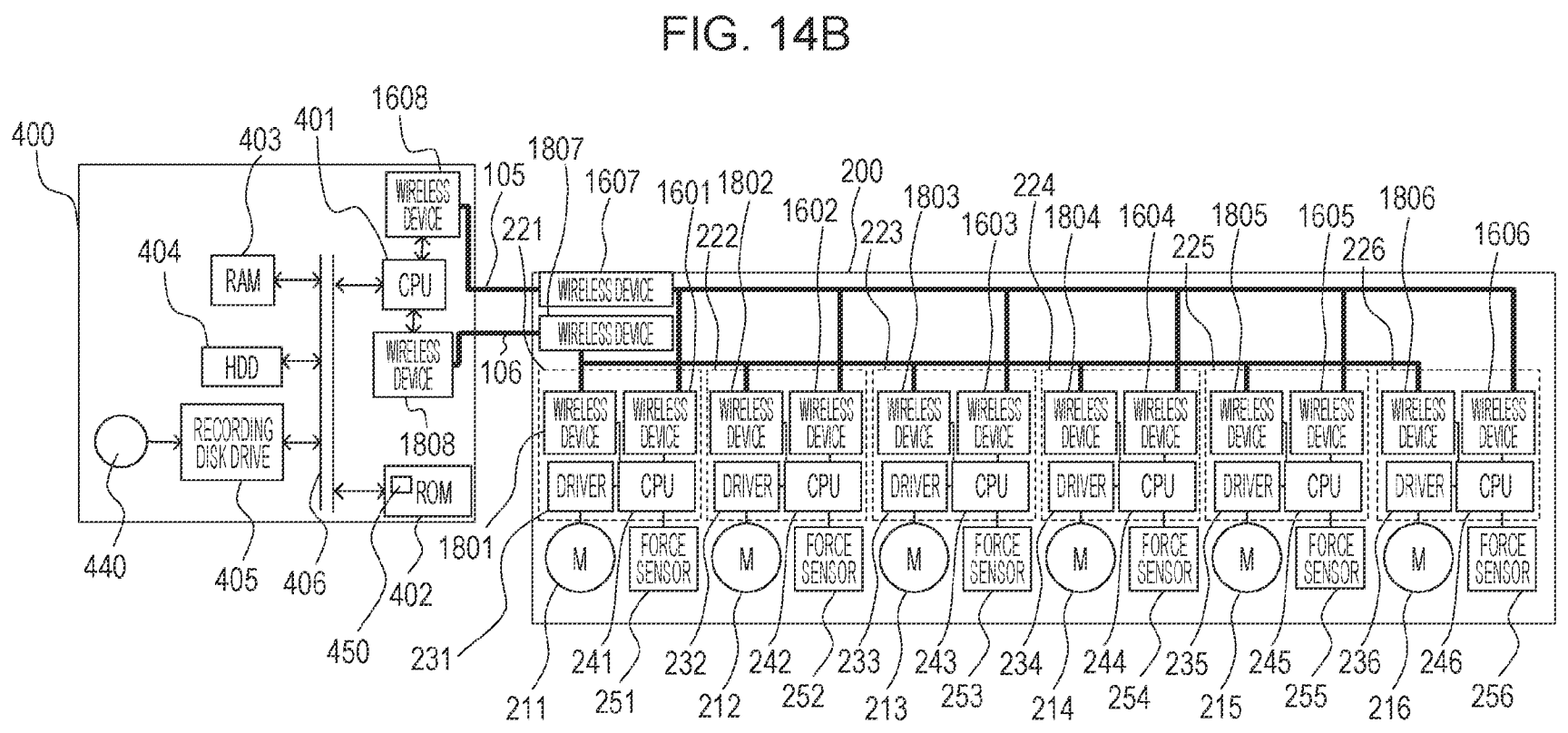

FIGS. 14A and 14B illustrate the communication methods used when the robot arm body 200 is operating normally and when some abnormality occurs. FIG. 14A illustrates the communication method used when the robot arm body 200 is operating normally, and FIG. 14B illustrates the communication method used when some abnormality has occurred in the robot arm body 200. According to the present embodiment, an abnormality is the occurrence of a communication error in one of the wireless communications, such as a disconnection fault. According to the present embodiment, the communication method illustrated in FIG. 14A is also referred to as "communication method 1", and the communication method illustrated in FIG. 14B is also referred to as "communication method 2". Communication methods 1 and 2 according to the present embodiment are the same as those according to the embodiment described above.

Referring to FIG. 14A, the control device 400 periodically communicates with the arm motor control devices 221 to 226. In FIG. 14A, the control device 400 uses wireless communication 105 and wireless communication 106 to communicate with different arm motor control devices. In the example illustrated in FIG. 14A, the control device 400 communicates with the arm motor control devices 221, 223, and 225 via wireless communication 105. In contrast, the control device 400 communicates with the arm motor control devices 222, 224, and 226 via wireless communication 106. During one communication period, each of wireless communications 105 and 106 relays communication between the three arm motor control devices and the control device 400.

According to the present embodiment, half of the arm motor control devices 221 to 226 perform communication using wireless communication 105, and the other half perform communication using wireless communication 106. However, the present embodiment is not limited thereto. For example, communication with four of the arm motor control devices 221 to 226 may be performed using wireless communication 105 (or wireless communication 106), and communication with the other two may be performed using wireless communication 106 (or wireless communication 105).

Referring to FIG. 14B, like FIG. 14A, the control device 400 periodically communicates with the arm motor control devices 221 to 226. In the case illustrated in FIG. 14B, the control device 400 performs communication of the same information (the same communication) with the target arm motor control devices in parallel via wireless communication 105 and wireless communication 106. In the example illustrated in FIG. 14B, the control device 400 communicates with the arm motor control devices 221 to 226 via each of wireless communications 105 and 106. The information communicated via wireless communication 105 is the same as the information communicated via wireless communication 106. For this reason, even if communication via one of the wireless communications is disconnected due to a malfunction or other reason, communication can be continued via the other wireless communication. In the case illustrated in FIG. 14A, the volume of communication with the control device 400 can be reduced as compared with in the case illustrated in FIG. 14B.

Figure 15:
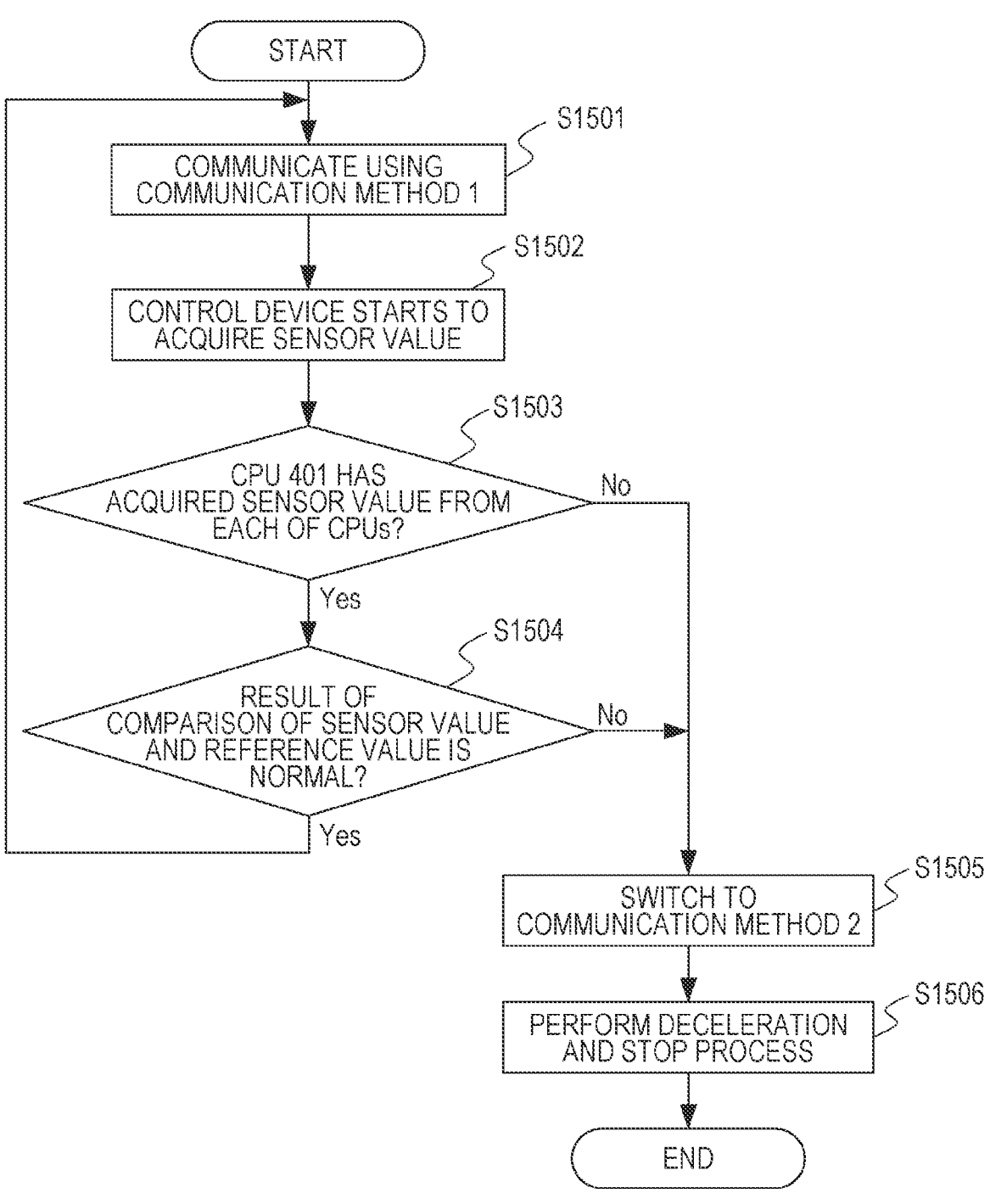
FIG. 15 is a flowchart of the control process according to the embodiment.

FIG. 15 is a control flowchart illustrating switching between the communication methods according to the present embodiment.

The control flowchart described in FIG. 15 is executed by the CPU 401 of the control device 400.

Referring to FIG. 15, in step S1501, since normal control is being performed in the robot arm body 200, communication is performed with each of the arm motor control devices 221 to 226 using communication method 1 based on period T1. According to communication using communication method 1, the arm motor control devices are divided into two groups each consisting of three arm motor control devices, and communication is performed with one group using wireless communication 105 and the other group using wireless communication 106. Therefore, the communication period can be reduced in normal times.

In step S1502, a process is started to acquire the sensor value from each of the sensors connected to the arm motor control devices 221 to 226.

In step S1503, it is determined whether in step S1502, the sensor values from the CPUs 241 to 246 are correctly received by the CPU 401. If the sensor values from all of the CPUs 241 to 246 are correctly received by the CPU 401 (Yes in step S1503), the processing proceeds to step S1504. If any of the sensor values has not been received from the CPUs 241 to 246 (No in step S1503), the processing proceeds to step S1505.

This is because at least one CPU from which the signal has not been received is found and, thus, it can be determined that some abnormality has occurred in the communication system or in the robot arm body 200.

In step S1504, each of the sensor values obtained through steps S1502 and S1503 is compared with a reference sensor value set by the user in advance to determine whether the detected sensor value or the difference is within the threshold. If the sensor value or the difference is within the threshold (Yes in step S1504), it is determined that the sensor value or the difference is normal, and the processing returns to step S1501. If not (No in step S1504), it is determined that some abnormality has occurred in the communication system or in the robot arm body 200, and the processing proceeds to step S1505.

In step S1505, the communication between the control device 400 and each of the arm motor control devices at periods T2 is switched to communication method 2. Communication method 2 is a redundantly designed communication method for communicating with each of the arm motor control devices via wireless communications 105 and 106. As a result, even if some abnormality occurs in any of the wireless communications, data can be acquired from each of the arm motor control devices.

In step S1506, the control device 400 uses communication method 2 and performs a process on each of the arm motor control devices to decelerate and stop the arm motor.

According to the present embodiment, the communication method between the control device 400 and the arm motor control devices 221 to 226, which control the motors in the robot arm, is switched in accordance with whether the robot or the communication system is in a normal mode or an abnormal mode. Thus, even in the case of wireless communication in a normal mode, the communication period can be reduced, and the communication is performed. As a result, the control period can be improved. In an abnormal mode, redundant, reliable communication can be performed and, thus, user safety can be improved.

If there is a CPU that cannot acquire a sensor value or a signal in wireless communication 106 for communicating with the CPU 401, the stopping process of the robot arm body 200 is performed via wireless communications 105 and 106, regardless of the detected value of the force sensor. This reduces the danger to the user caused by missing an abnormal value of the force sensor due to an abnormality in one of the wireless communications. Furthermore, since the stopping process is performed via two wireless communications, the robot arm body 200 can be reliably stopped.

Sixth Embodiment

The sixth embodiment is described in detail below. The present embodiment is described below with reference to the case where both communication lines and wireless communication are used in the communication between the control device 400 and each of the arm motor control devices 221 to 226. Hereinafter, parts of the hardware configuration and the control system configuration that differ from those of the above-described embodiment are illustrated and described. The same parts as those of the first embodiment can have the same configurations and operations as those described above, and detailed description is not given.

Figure 16:
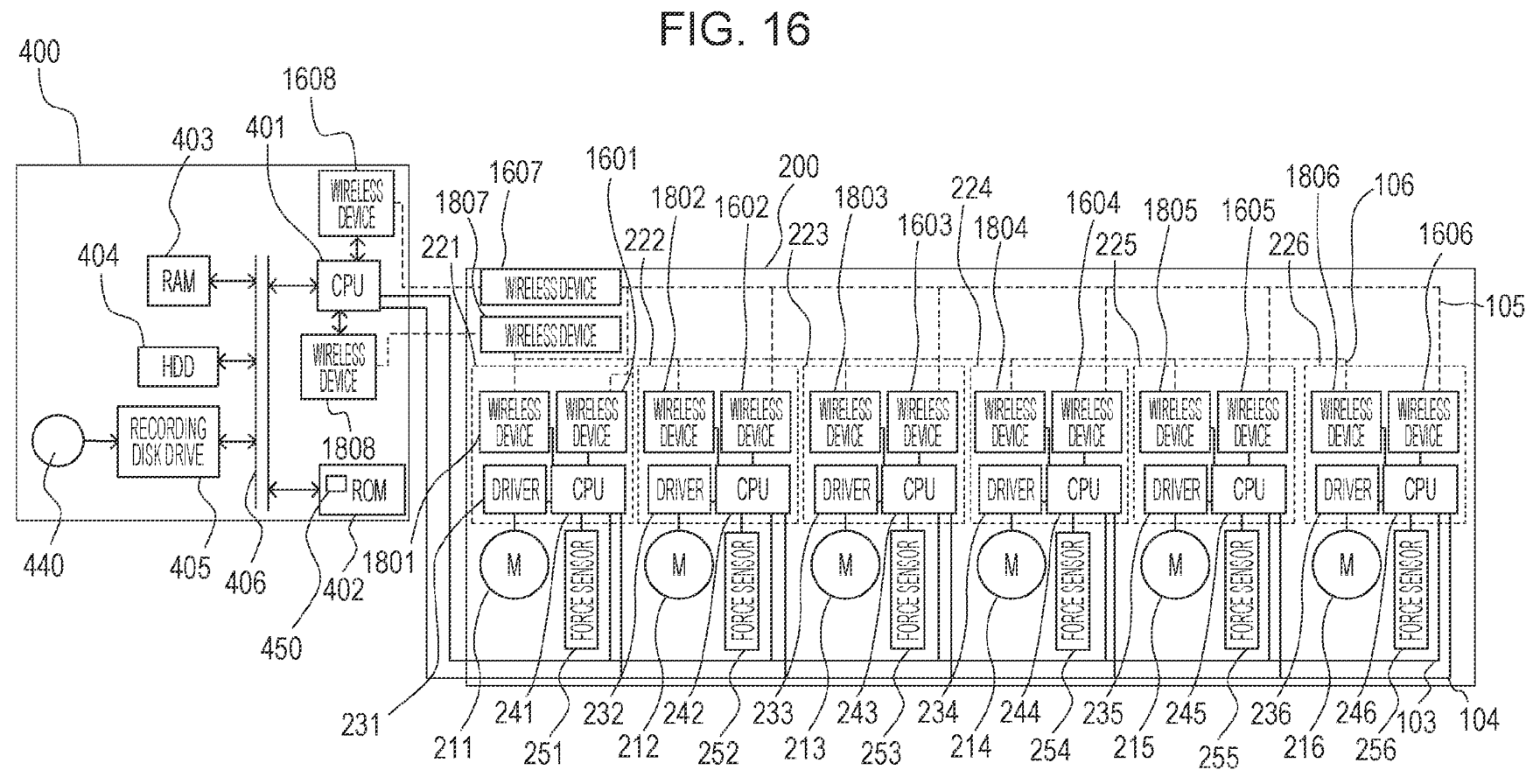

FIG. 16 is a control block diagram of the robot arm body 200 according to the present embodiment. Referring to FIG. 16, each of the communication lines 103 and 104 is used to connect the arm motor control devices 221 to 226 with one another so that the arm motor control devices 221 to 226 can share various kinds of information. The connection method for connecting the arm motor control devices 221 to 226 may be a cascade connection, a bus connection, or a daisy chain connection, and according to the present embodiment, a bus connection is used. The communication line 104 enables the arm motor control devices 221 to 226 to share various kinds of information at a period less than the communication period of the communication line 103. The communication period of the communication line 103 is set to about 2 ms, and the period of the communication line 104 is set to about 100 s. Although not illustrated in FIG. 16 for simplicity, the communication lines 103 and 104 are further connected to a hand motor controller, so that the hand motor controller can communicate with the control device 400 and each of the arm motor control devices 221 to 226.

Referring to FIG. 16, the arm motor control devices 221 to 226 include wireless devices 1601 to 1606 and wireless devices 1801 to 1806 that are connected to the CPUs 241 to 246, respectively. Furthermore, a wireless device 1607 and a wireless device 1807 are provided in the robot arm body 200. The wireless device 1607 performs overall control of the wireless devices 1601 to 1606 and performs wireless communication, and the wireless device 1807 performs overall control of the wireless devices 1801 to 1806 and performs wireless communication. The control device 400 includes a wireless device 1608 that wirelessly communicates with the wireless device 1607, and the wireless device 1608 is connected to the CPU 401. Similarly, the control device 400 includes a wireless device 1808 that wirelessly communicates with the wireless device 1807, and the wireless device 1808 is connected to the CPU 401. Through wireless communication 105 performed by the wireless devices 1601 to 1608, the CPU 401 can communicate with the CPUs 241 to 246, respectively. In addition, through wireless communication 106 performed by the wireless devices 1801 to 1808, the CPU 401 can communicate with the CPUs 241 to 246, respectively.

While the present embodiment is described with reference to the robot arm body 200 including the wireless devices 1607 and 1807 that perform overall control of the wireless devices, the present embodiment is not limited thereto. For example, the wireless devices 1607 and 1807 may be removed, and the wireless devices 1601 to 1606 may be directly connected to each other like a daisy chain and be connected to the wireless device 1608. In addition, the wireless devices 1801 to 1806 may be directly connected and be connected to the wireless device 1808. Although not illustrated for simplicity, wireless communications 105 and 106 are further connected to a hand motor controller so that the hand motor controller can communicate with the control device 400 and the arm motor control devices 221 to 226. The communication line 103 is also referred to as a "first communication medium", the communication line 104 is also referred to as a "second communication medium", the wireless communication 105 is also referred to as a "third communication medium", and the wireless communication 106 is also referred to as a "fourth communication medium".

Figure 17A:
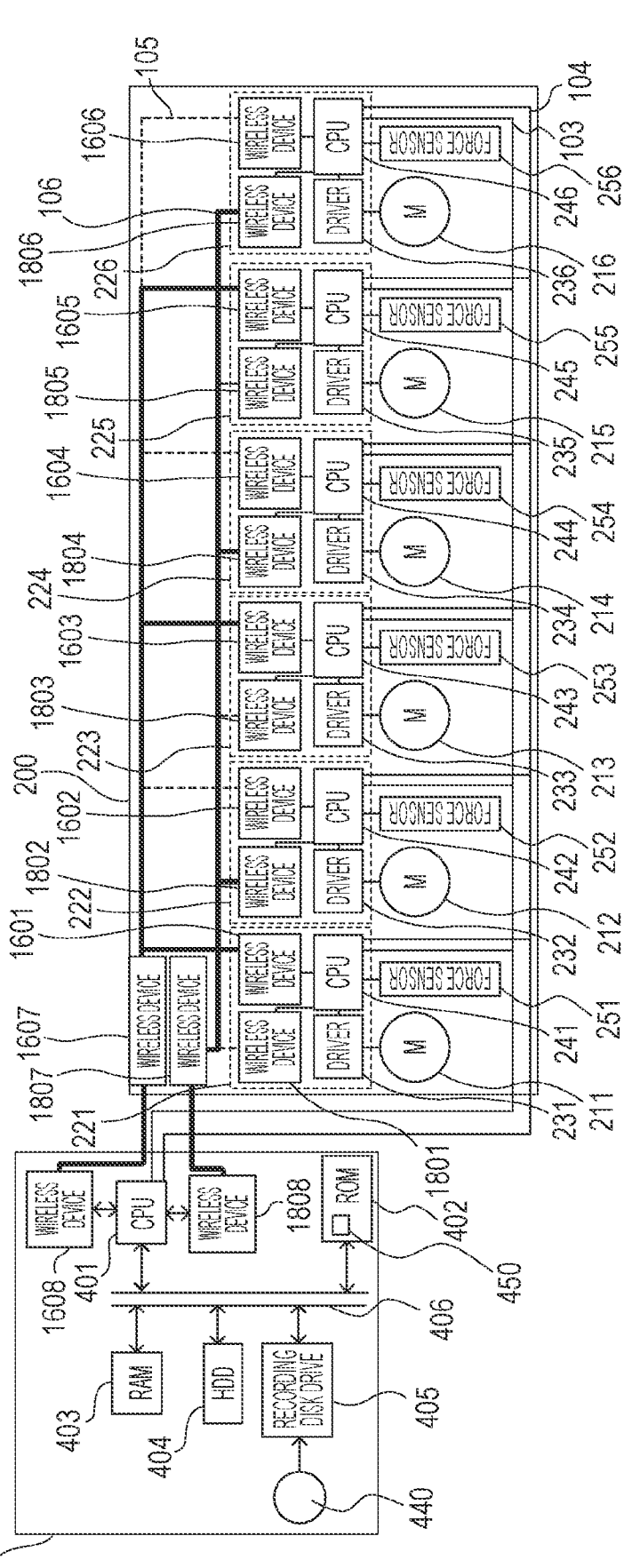
FIGS. 17A and 17B are timing diagrams of communication method 1 (the first mode) and communication method 2 (the second mode), respectively, according to the embodiment.
Figure 17B:
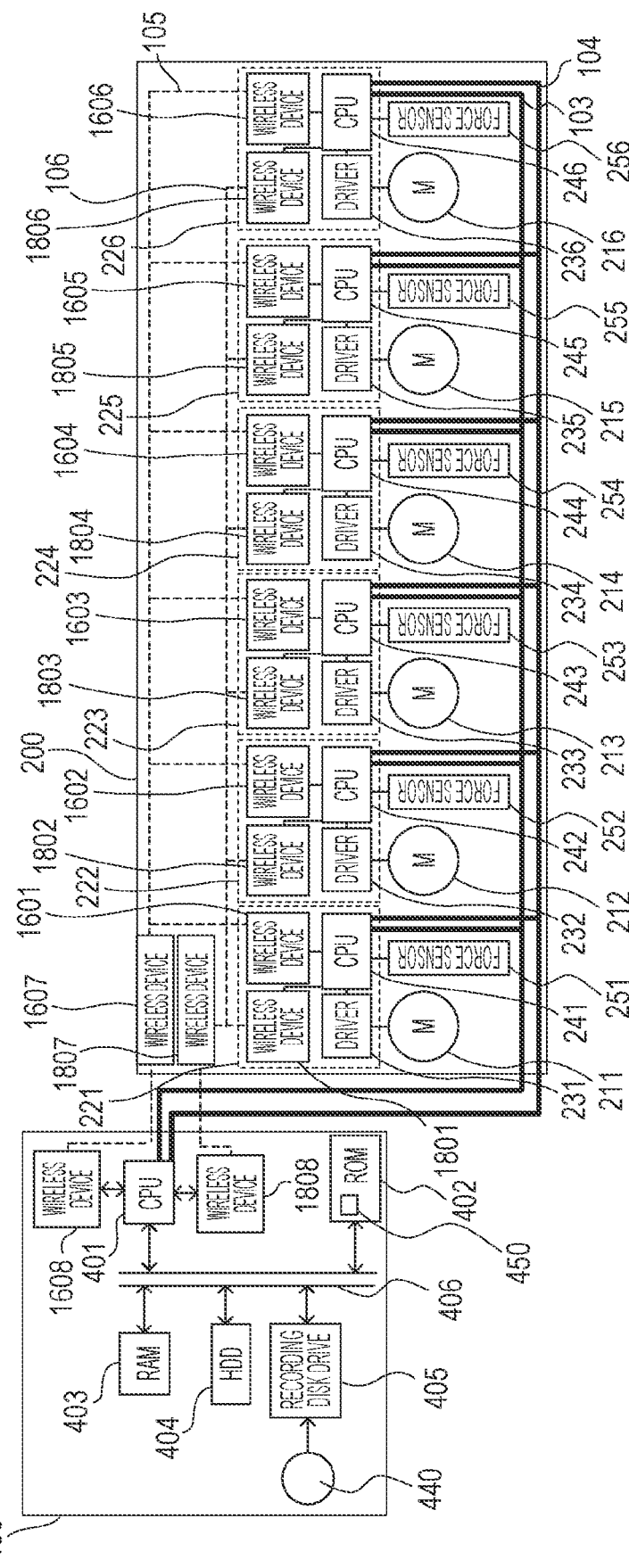

FIGS. 17A and 17B illustrate the communication methods used when the robot arm body 200 is operating normally and when some abnormality occurs. FIG. 17A illustrates the communication method used when the robot arm body 200 is operating normally, and FIG. 17B illustrates the communication method used when some abnormality has occurred in the robot arm body 200. According to the present embodiment, an abnormality is the occurrence of a communication error in one of wireless communications, such as a disconnection fault. As used herein, the communication method illustrated in FIG. 17A is also referred to as "communication method 1", and the communication method illustrated in FIG. 17B is also referred to as "communication method 2". Communication methods 1 and 2 according to the present embodiment are the same as those according to the embodiments described above.

Referring to FIG. 17A, the control device 400 periodically communicates with the arm motor control devices 221 to 226. In FIG. 17A, the control device 400 uses wireless communication 105 and wireless communication 106 to communicate with different arm motor control devices. In the example illustrated in FIG. 17A, the control device 400 communicates with the arm motor control devices 221, 223, and 225 via wireless communication 105. In contrast, the control device 400 communicates with the arm motor control devices 222, 224, and 226 via wireless communication 106. During one communication period, each of wireless communications 105 and 106 relays communication between the three arm motor control devices and the control device 400.

According to the present embodiment, half of the arm motor control devices 221 to 226 perform communication using wireless communication 105, and the other half perform communication using wireless communication 106. However, the present embodiment is not limited thereto. For example, communication with four of the arm motor control devices 221 to 226 may be performed using wireless communication 105 (or wireless communication 106), and communication with the other two may be performed using wireless communication 106 (or wireless communication 105).

Referring to FIG. 17B, when some abnormality occurs, wireless communication is switched to wired communication. Commands are simultaneously transmitted from the control device 400 to the arm motor control devices 221 to 226 via the communication line 103 and the communication line 104. Then, signals are sequentially transmitted from the arm motor control devices 221 to 226 to the control device 400 via the communication lines 103 and the communication line 104. At this time, communication with the arm motor control devices 221 to 226 is performed via both the communication lines 103 and 104. In communication method 2, communication via the communication line 103 and the communication line 104 is performed at periods T2. In the example illustrated in FIG. 17B, the control device 400 communicates with the arm motor control devices 221 to 226 via each of the communication lines 103 and 104. The information communicated via the communication line 103 is the same as the information communicated via the communication line 104. As a result, even if neither of the wireless communications is available due to a malfunction or other reason, communication can be continued via the wired communication. In the case illustrated in FIG. 17A, the volume of communication with the control device 400 can be reduced as compared with in the case illustrated in FIG. 17B.

The switching between the communication methods is the same as in FIG. 15, and description of switching is omitted.

As described above, according to the present embodiment, in addition to switching between the communication methods between the control device 400 and each of the arm motor control devices 221 to 226 that control the motors in the robot arm, switching between wired communication and wireless communication is carried out in accordance with whether the robot or communication system is in a normal mode or abnormal mode. As a result, even in the case of wireless communication, communication can be performed at short communication periods in normal times. Consequently, the control period can be improved. In abnormal times, redundancy is used, and wired communication is further used, so that reliable communication can be performed, and user safety can be further improved.

Other Embodiments

The procedures for processing of the embodiments described above are specifically carried out by the CPU of the control device and the CPUs of the arm motor control devices. Therefore, the above-described functions can be realized by reading, from a recording medium, a software program capable of executing the functions. In this case, the program read from the recording medium realizes the functions of the embodiments described above, and each of the program and the recording medium storing the program constitutes embodiments of the present disclosure.

While the above embodiments have been described with reference to a computer-readable recording medium that is a read only memory (ROM), a random access memory (RAM), or a flash ROM and a program that is stored in the ROM, RAM, or flash ROM, the present disclosure is not limited to the embodiments. A program for implementing embodiments of the present disclosure may be recorded in any type of computer-readable recording medium. For example, any one of a hard disk drive (HDD), a solid state drive (SSD), an external storage device, and a recording disk may be used as the recording medium for supplying the control program.

While the above embodiments have been described with reference to the robot arm body 200 that is an articulated robot arm with multiple joints, the number of joints is not limited thereto. While the above embodiments have been described with reference to the robot arm having a vertical multi-axis configuration, the same configuration as described above can be applied to a different type of joint, such as a horizontal multi-joint type, parallel link type, or orthogonal robot.

While the above embodiments have been described with reference to the example in which the arm motors 211 to 216 in the robot arm body 200 are stopped, the present disclosure is not limited thereto. For example, the hand motor 311 in the robot hand body 300 can be controlled using the above-described method according to embodiments of the present disclosure.

In addition, the above embodiments have been described with reference to the case in which stop processing is performed when the detected value of the sensor is greater than a reference value, and normal processing is performed when the detected value of the sensor is less than or equal to the reference value. However, the stop processing may be performed when the detected value of the sensor is greater than or equal to the reference value, and the normal processing may be performed when the detected value of the sensor is less than the reference value.

The embodiments described above can be applied to machines that can automatically perform extension/retraction, bending, vertical movement, lateral movement, turning operations, or any combination of the operations on the basis of the information in a memory device provided in a control device.

The present disclosure is not limited to the embodiments described above, and many modifications can be made within the technical concept of the disclosure. The effects described in the embodiments of the disclosure are merely the most suitable effects arising from the embodiments of the disclosure, and the effects of embodiments of the disclosure are not limited to those described in the embodiments of the disclosure. In addition, the embodiments and modifications described above may be appropriately combined.

According to embodiments of the present disclosure, the control period for controlling a robot body can be improved.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure includes exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-101953, filed Jun. 24, 2022, which is hereby incorporated by reference herein in its entirety.

What is claimed is:

1. A robot system comprising:

a robot body;

a plurality of first control devices provided in the robot body;

a second control device configured to communicate with the plurality of first control devices;

a first communication medium configured to enable the plurality of first control devices to communicate with the second control device; and a second communication medium configured to enable the plurality of first control devices to communicate with the second control device, wherein the second control device selectively operates in one of a first mode and a second mode, wherein in the first mode, the second control device communicates with a part of the plurality of first control devices not using the second communication medium and using the first communication medium, and the second control device communicates with the rest of the plurality of first control devices not using the first communication medium and using the second communication medium, wherein in the second mode, the second control device transmits information to all the plurality of first control devices using both the first communication medium and second communication medium, wherein the robot body includes a first detection unit configured to acquire a state of the robot body and a second detection unit different from the first detection unit, wherein the plurality of first control devices transmit a first detection result of the first detection unit and a second detection result of the second detection unit to the second control device, wherein when communicating in the first mode, the second control device switches to the second mode on a basis of a comparison result of the first detection result and the second detection result, wherein a first control device among the plurality of first control devices divides one of the first detection result and the second detection result and transmits the divided results to the second control device in different periods, and wherein the first control device divides one of the first detection result and the second detection result into a first bit group, a second bit group, a third bit group, and a fourth bit group.

2. The robot system according to claim 1, wherein the first detection unit is used to control the robot body, and the second detection unit is used to determine whether the first detection unit is normal.

3. The robot system according to claim 1, wherein the second control device executes the second mode to stop the robot body.

4. The robot system according to claim 1, wherein the second control device executes the second mode when a user teaches the robot body.

5. The robot system according to claim 4, wherein the teaching is done by the user operating the robot body by using an external input device or by directly touching the robot body.

6. The robot system according to claim 1, wherein the second control device executes the second mode when a user is in close vicinity to the robot body.

7. The robot system according to claim 6, wherein the second control device communicates with the first control device in the first mode when the robot body operates normally and switches from the first mode to the second mode when the user is in close vicinity to the robot body.

8. The robot system according to claim 6, wherein the second control device executes the second mode to reduce a speed of an operation performed by the robot body.

9. The robot system according to claim 1, wherein the first communication medium and the second communication medium are wired communication media in the form of communication lines.

10. The robot system according to claim 1, wherein the first communication medium and the second communication medium are wireless communication media in the form of wireless devices.

11. The robot system according to claim 1, wherein the first communication medium and the second communication medium are wired communication media in the form of communication lines, wherein a third communication medium and a fourth communication medium each different from the first communication medium and the second communication medium are wireless communication media in the form of wireless devices, and wherein the second control device executes the first mode using the third communication medium and the fourth communication medium that are wireless communication media and executes the second mode using the first communication medium and the second communication medium that are wired communication media.

12. The robot system according to claim 11, wherein the second control device communicates with the part of the plurality of first control devices using the third communication medium and communicates with the rest of the plurality of first control devices using the fourth communication medium in the first mode.

13. The robot system according to claim 1, wherein the first communication medium and the second communication medium are used in parallel in the second mode, and the same information is transmitted from the second control device to each of target first control device among in the plurality of first control devices.

14. A method for manufacturing a product, the method comprising:

manufacturing the product using the robot system according to claim 1.

15. A method for controlling a robot system, the robot system including a robot body, a plurality of first control devices provided in the robot body, a second control device configured to communicate with the plurality of first control devices, a first communication medium configured to enable the plurality of first control devices to communicate with the second control device, and a second communication medium configured to enable the plurality of first control devices to communicate with the second control device, the method comprising:

selectively executing a first mode and a second mode, wherein in the first mode, the second control device communicates with a part of the plurality of first control devices not using the second communication medium and using the first communication medium, and the second control device communicates with the rest of the plurality of first control devices not using the first communication medium and using the second communication medium, wherein in the second mode, the second control device transmits information to all the plurality of first control devices using both the first communication medium and second communication medium, wherein the robot body includes a first detection unit configured to acquire a state of the robot body and a second detection unit different from the first detection unit, wherein the plurality of first control devices transmit a first detection result of the first detection unit and a second detection result of the second detection unit to the second control device, wherein when communicating in the first mode, the second control device switches to the second mode on a basis of a comparison result of the first detection result and the second detection result, wherein the first control device divides one of the first detection result and the second detection result and transmits the divided results to the second control device in different periods, and wherein the plurality of first control device divides one of the first detection result and the second detection result into a first bit group, a second bit group, a third bit group, and a fourth bit group.

16. A non-transitory computer-readable recording medium storing one or more control programs including executable instructions, which when executed by a computer, cause the computer to perform the method according to claim 15.

* * * * *